(12) United States Patent
Van der Auwera et al.

(10) Patent No.: US 9,445,130 B2
(45) Date of Patent: Sep. 13, 2016

(54) BLOCKINESS METRIC FOR LARGE HEVC BLOCK ARTIFACTS

(71) Applicant: QUALCOMM Incorporated, San Diego, CA (US)

(72) Inventors: Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 14/150,306

(22) Filed: Jan. 8, 2014

(65) Prior Publication Data

US 2014/0192892 A1 Jul. 10, 2014

Related U.S. Application Data

(60) Provisional application No. 61/750,737, filed on Jan. 9, 2013.

(51) Int. Cl.
| | |
|---|---|
| *H04N 19/91* | (2014.01) |
| *H04N 19/86* | (2014.01) |
| *H04N 19/176* | (2014.01) |
| *H04N 19/117* | (2014.01) |
| *H04N 19/14* | (2014.01) |

(52) U.S. Cl.
CPC ............ *H04N 19/86* (2014.11); *H04N 19/117* (2014.11); *H04N 19/14* (2014.11); *H04N 19/176* (2014.11)

(58) Field of Classification Search
CPC .. H04N 19/117; H04N 19/14; H04N 19/176; H04N 19/86
See application file for complete search history.

(56) References Cited

U.S. PATENT DOCUMENTS

| | | | |
|---|---|---|---|
| 7,050,504 B2 | 5/2006 | Joch et al. | |
| 2009/0263032 A1* | 10/2009 | Tanaka | H04N 19/117 382/233 |

(Continued)

FOREIGN PATENT DOCUMENTS

WO 2011096869 A1 8/2011

OTHER PUBLICATIONS

Auwera et al., "AHG6: On HEVC block artifact reduction," JCT-VC Meeting; MPEG Meeting; Geneva, CH.(Joint Collaborative Team on Video Coding of ITU-T SG.16 WP 3 and ISO/IEC JTC1/SC29/WG11); URL: http://wftp3.itu.int/av-arch/jctvc-site/, No. JCTVC-L0386, Jan. 14-23, 2013, 3 pp.

(Continued)

*Primary Examiner* — Dave Czekaj
*Assistant Examiner* — Md Haque
(74) *Attorney, Agent, or Firm* — Shumaker & Sieffert, P.A.

(57) ABSTRACT

In one example, a method for encoding video data includes determining a first value for a line of a first plurality of lines, wherein the first plurality of lines are perpendicular to a first edge of a block of the video data; in response to determining that the value satisfies at least one threshold: determining a second value for the line of the first plurality of lines; and determining a second value for a line of a second plurality of lines, wherein the second plurality of lines are perpendicular to a second edge of the block of video data; determining, based on the second value for the line of the first plurality of lines and the second value for the line of the second plurality of lines, an average value; and determining, based on the average value, whether or not to encode one or more deblocking parameter offsets.

30 Claims, 5 Drawing Sheets

(56) References Cited

U.S. PATENT DOCUMENTS

2011/0188574 A1* 8/2011 Matsuo ............... H04N 19/176
375/240.12
2013/0170562 A1* 7/2013 Van der
Auwera ............ H04N 19/0089
375/240.25

OTHER PUBLICATIONS

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, CH, Nov. 21-30, 2011, JCTVC-G1103_d2, 214 pp.
Chen et al., "Design a deblocking filter with three separate modes in DCT-based coding," Journal of Visual Communication and Image Representation, vol. 19, No. 4, Feb. 29, 2008, 14 pp.
International Search Report and Written Opinion—PCT/US2014/010846—ISA/EPO—Mar. 27, 2014, 17 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Kim et al., "Reduction of Blocking Artifacts for HDTV using Offset-and-Shift Technique," IEEE Transactions on Consumer Electronics, vol. 53, No. 4, Nov. 2007, 8 pp.
Kwon et al., "Non-CE1: Suppression of blocking artifacts at large TU boundaries," JCT-VC Meeting; MPEG Meeting; Shanghai, CN; (Joint Collaborative Team on Video Coding of ITU-T SG.16 WP3 and ISO/IEC JTC1/SC29/WG11); URL: http://wftp3.itu.int/av-arch/jctvc-site/,, No. JCTVC-K0269, Oct. 10-19, 2012, 16 pp.
Norkin et al., "HEVC Deblocking Filter," IEEE Transactions on Circuits and Systems for Video Technology, vol. 22, No. 12, Dec. 2012, 9 pp.
Pan et al., "A locally adaptive algorithm for measuring blocking artifacts in images and videos," Signal Processing, Image Communication, vol. 19, No. 6, Apr. 14, 2004, 8 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.
Wiegand et al., "WD1: Working Draft 1 of High-Efficiency Video Coding", JCTVC-C403, 3rd Meeting: Guangzhou, CN, Oct. 7-15, 2010, 137 pp.
International Preliminary Report on Patentability from International Application No. PCT/US2014/010846, mailed Apr. 23, 2015, 12 pp.
Second Written Opinion of International Application No. PCT/US2014/010846, mailed Dec. 12, 2014, 7 pp.
ITU-T H.265, Series H: Audiovisual and Multimedia Systems, Infrastructure of audiovisual services—Coding of moving video, High efficiency video coding, The International Telecommunication Union, Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

* cited by examiner

BLOCKINESS METRIC FOR LARGE HEVC BLOCK ARTIFACTS

This application claims the benefit of U.S. Provisional Application No. 61/750,737, filed Jan. 9, 2013, the entire content of which is incorporated herein by reference.

TECHNICAL FIELD

This disclosure relates to video coding, and more particularly, to deblocking video data.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode that defines how the predictive block is created and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for deblocking coded blocks of video data, e.g., transform units (TUs), coding units (CUs), or prediction units (PUs). Block-based video coding techniques can sometimes lead to "blockiness" artifacts, where boundaries or edges between individually coded blocks can be perceived.

In general, deblocking involves two steps: determining whether a particular edge between two blocks should be deblocked, and then deblocking edges for which a determination that they should be deblocked is made. One or more parameters may be used to determine filtering strength and coefficients used for deblocking decisions (e.g., whether to deblock an edge).

The techniques of this disclosure may improve deblocking functions applied to such edges (e.g., reducing the appearance of an edge) and, more particularly, may improve the determination of whether to deblock an edge and how to deblock the edge. In particular, according to the techniques of this disclosure, a video encoder may determine whether or not to encode one or more deblocking parameter offsets which may be signaled to a video decoder to control the deblocking process.

In one example, a method for encoding video data includes determining a first value for a line of a first plurality of lines, wherein the first plurality of lines are perpendicular to a first edge of a block of the video data. In this example, the method may also include in response to determining that the first value satisfies at least one threshold: determining a second value for the line of the first plurality of lines; and determining a second value for a line of a second plurality of lines, wherein the second plurality of lines are perpendicular to a second edge of the block of video data, and wherein the first edge is a vertical edge or a horizontal edge and wherein the second edge is a different edge of the vertical edge or the horizontal edge. In this example, the method may also include determining, based on the second value for the line of the first plurality of lines and the second value for the line of the second plurality of lines, an average value; and determining, based on the average value, whether or not to encode one or more deblocking parameter offsets.

In another example, a device for encoding video data includes a video encoder. In this example, the video encoder may be configured to determine a first value for a line of a first plurality of lines, wherein the first plurality of lines are perpendicular to a first edge of a block of the video data. In this example, the video encoder may also be configured to in response to determining that the first value satisfies at least one threshold: determine a second value for the line of the first plurality of lines; and determine a second value for a line of a second plurality of lines, wherein the second plurality of lines are perpendicular to a second edge of the block of video data, and wherein the first edge is a vertical edge or a horizontal edge and wherein the second edge is a different edge of the vertical edge or the horizontal edge. In this example, the video coder may also be configured to determine, based on the second value for the line of the first plurality of lines and the second value for the line of the second plurality of lines, an average value, and determine, based on the average value, whether or not to encode one or more deblocking parameter offsets.

In another example, a device for encoding video data includes means for determining a first value for a line of a first plurality of lines, wherein the first plurality of lines are perpendicular to a first edge of a block of the video data. In this example, the device may also include means for determining, in response to determining that the first value satisfies at least one threshold, a second value for the line of the first plurality of lines and means for determining, in response to determining that the value satisfies the at least one threshold, a second value for a line of a second plurality of lines, wherein the second plurality of lines are perpendicular to a second edge of the block of video data, and wherein the first edge is a vertical edge or a horizontal edge and wherein the second edge is a different edge of the vertical edge or the horizontal edge. In this example, the device may also include means for determining, based on the second value for the line of the first plurality of lines and the second value for the line of the second plurality of lines, an average value, and means for determining, based on the average value, whether or not to encode one or more deblocking parameter offsets.

In another example, a non-transitory computer-readable storage medium includes instructions that, when executed, cause one or more processors to encode video data. In this example, the instructions that cause the one or more processors to encode the video data include instructions that cause the one or more processors to determine a first value for a line of a first plurality of lines, wherein the first plurality of lines are perpendicular to a first edge of a block of the video data. In this example, the instructions that cause the one or more processors to encode the video data may also include instructions that cause the one or more processors to, in response to determining that the first value satisfies at least one threshold, determine a second value for the line of the first plurality of lines, and determine a second value for a line of a second plurality of lines, wherein the second plurality of lines are perpendicular to a second edge of the block of video data, and wherein the first edge is a vertical edge or a horizontal edge and wherein the second edge is a different edge of the vertical edge or the horizontal edge. In this example, the instructions that cause the one or more processors to encode the video data may also include instructions that cause the one or more processors to determine, based on the second value for the line of the first plurality of lines and the second value for the line of the second plurality of lines, an average value, and determine, based on the average value, whether or not to encode one or more deblocking parameter offsets.

The details of one or more examples of the invention are set forth in the accompanying drawings and the description below. Other features, objects, and advantages of the invention will be apparent from the description and drawings, and from the claims.

DETAILED DESCRIPTION

Figure 1:
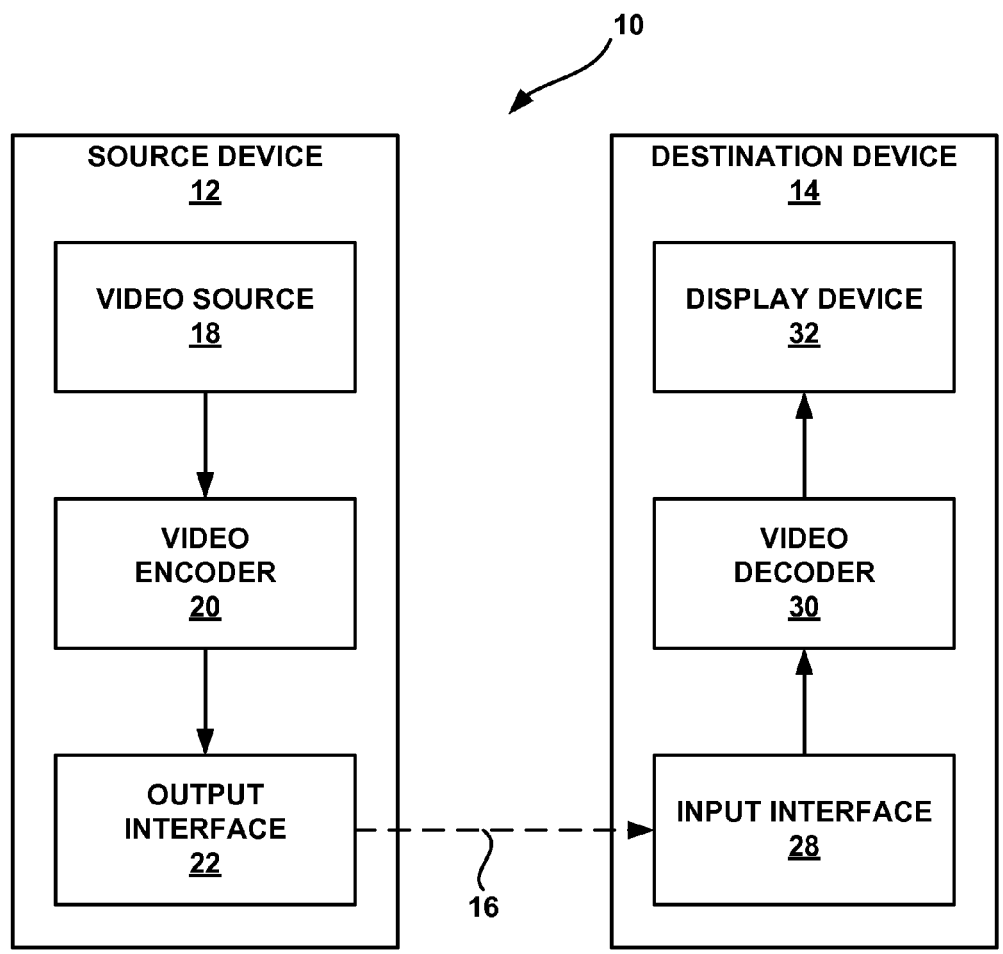
FIG. 1 is a block diagram illustrating an example video encoding and decoding system that may determine whether to code deblocking filter parameters according to the techniques described in this disclosure.

Video coders, such as video encoders and video decoders, are generally configured to code individual pictures of a sequence of pictures using either spatial prediction (or intra-prediction) or temporal prediction (or inter-prediction). More particularly, video coders may predict blocks of a picture using intra-prediction or inter-prediction. Video coders may code residual values for the blocks, where the residual values correspond to pixel-by-pixel differences between a predicted block and an original (that is, uncoded) block. Video coders may transform a residual block to convert values of the residual block from a pixel domain to a frequency domain. Moreover, video coders may quantize transform coefficients of the transformed residual block using a particular degree of quantization indicated by a quantization parameter (QP).

In some cases, block-based coding in this manner may lead to blockiness artifacts between blocks of the picture. That is, after dividing a frame into blocks, coding the blocks, and then decoding the blocks, perceptible artifacts at edges between the blocks may occur. Therefore, video coders may perform various deblocking procedures to remove the blockiness artifacts.

For example, video encoders may encode video data of a frame, then subsequently decode the encoded video data, and then apply deblocking filters to the decoded video data for use as reference video data. Reference data may be data from one or more pictures that a video encoder may use, for example, for inter-prediction of subsequently coded video data. A video encoder may store one or more frames within a reference frame store for inter-prediction.

Such deblocking filtering performed by a video coding device, such as a video encoder or video decoder, prior to storing the decoded video data for use as reference data is generally referred to as "in-loop" filtering. In "in-loop" filtering, a video encoder or decoder may perform the deblocking within a video loop. Video encoders may begin with receiving raw video data, encoding the video data, decoding the encoded video data, deblocking the decoded video data, and storing deblocked pictures in a reference picture memory.

Video decoders may be configured to decode received video data, and then apply the same deblocking filters as was applied by the encoder to the decoded video data. Video decoders may deblock decoded video data for purposes of displaying the video data, e.g., to a user of a device including the decoder, as well as for use as reference video for subsequent video data to be decoded, e.g., for storage in a reference picture memory. By configuring both encoders and decoders to apply the same deblocking techniques, the encoders and decoders can be synchronized, such that deblocking does not introduce error for subsequently coded video data using the deblocked video data for reference.

In general, deblocking involves two steps: determining whether a particular edge between two blocks should be deblocked, and then deblocking edges for which a determination that they should be deblocked is made. The deblocking process is influenced by a boundary filtering strength value, also referred to in this disclosure as a deblocking strength. Beta ($\beta$) and $t_c$ values may be used to determine filtering strength and coefficients used for deblocking decisions, e.g., whether to deblock an edge and, after determining to deblock the edge, a type of filter to use (e.g., strong or weak) and a width of the filter, if a weak filter is selected.

In some examples, a video encoder may signal the deblocking parameters (i.e., $\beta$ and $t_c$) to a video decoder by signaling one or more deblocking parameter offset values (i.e., a deblocking parameter offset value for $\beta$ and a deblocking parameter offset value offset value for $t_c$).

In accordance with one or more techniques of this disclosure, a video encoder may determine whether or not to encode the one or more deblocking parameter offset values. In some examples, the video encoder may determine whether or not to encode the one or more deblocking parameter offset values at the slice level, at the picture parameter set of video data (PPS) level, both, or neither.

In some examples, a video encoder may apply a blockiness metric which may analyze artifacts, such as large block artifacts, in each picture or picture region and may determine appropriate deblocking offset parameters that may be signalled to a video decoder. For example, a deblocking unit of the encoder may determine one or more blockiness metrics and encode the metrics (e.g., offset parameters) in a coded bitstream. The deblocking unit of the decoder may then apply the same metrics, upon decoding the coded bitstream.

In some examples, the encoder may analyze the vertical edge or the horizontal edge of a block grid. In some examples, the encoder may analyze one or both of the vertical edges and one or both of the horizontal edges of a block (e.g., a 32×32 block grid) in the picture. In general, any block size can be analyzed, although some specific examples are described herein. In some examples, a block size corresponding to the maximum transform size may be analyzed.

In some examples, the encoder may determine a first value for a line of a first plurality of lines. The line of the first plurality of lines may be perpendicular to a first edge of the block. For instance, the encoder may determine a first intermediate value $dp_i$ in accordance with equation (1), below. In some examples, the first intermediate value may be determined based on a first set of sample values of video data corresponding to the line. In some examples, the first set of sample values may be included in the block. The encoder may also determine a second intermediate value $dq_i$ in accordance with equation (2), below. In some examples, the second intermediate value may be determined based on a second set of sample values of video data corresponding to the line. In some examples, the second set of sample values may be included in a different, neighboring block. Finally, the encoder may determine the first value $d_i$ in accordance with equation (3), below.

$$dp_i = |p2_i - 2p1_i + p0_i| \quad (1)$$

$$dq_i = |q0_i - 2q1_i + q2_i| \quad (2)$$

$$d_i = (dp_i + dq_i) \quad (3)$$

The encoder may then determine whether the first value satisfies a threshold. For instance, the encoder may determine that the first value satisfies a threshold where the first value is greater than a first threshold and lesser than a second threshold. In some examples, by determining that the first value satisfies at least one threshold, the encoder may prevent the unnecessary deblocking of naturally occurring edges in the video. In some examples, the encoder may scale first value prior to determining whether or not the first value satisfies a threshold. The encoder may perform the scaling and determining in accordance with equation (4), below.

$$threshold1 < scalingvalue * d_i < threshold2 \quad (4)$$

If the encoder determines that the first value does not satisfy the threshold, the encoder may then determine a first value for another line perpendicular to an edge of the first block. In some examples, the other line may be included in the first plurality of lines, meaning that the other line is perpendicular to the first edge of the first block. In some examples, the other line may perpendicular to another edge of the first block. In some examples, the encoder may determine a first value for each line perpendicular to each edge of the first block and compare each determined first value to the one or more thresholds. If none of the determined first values satisfy the one or more thresholds, the encoder may determine not to determine the one or more deblocking parameter offsets.

If the encoder determines that the first value satisfies the threshold, the encoder may determine a second value for the line of the plurality of lines and determine a second value for a line of a second plurality of lines. In some examples, the second plurality of lines may be perpendicular to a second edge of the block grid. In some examples, the first edge may be a vertical edge or a horizontal edge. In some examples, the second edge may be a different edge of the vertical edge or the horizontal edge. In other words, where the first edge is a vertical edge, the second edge is a horizontal edge and vice versa. In some examples, the second edge may be the border between the first block and the third block. In some examples, the encoder may determine the second value for the line of the second plurality of lines based on a third sample of video data included in the first block and a fourth sample of video data included in a third block. In some examples, the encoder may determine the second value for the line of the first plurality of lines in accordance with equation (5), below. In some examples, the encoder may determine the second value for the line of the second plurality of lines in accordance with equation (6), below.

$$second\ value = |p0_i - q0_i| \quad (5)$$

$$second\ value = |p0_j - q0_j| \quad (6)$$

In equation (5), $p0_i$, may be the first sample corresponding to the line of the first plurality of lines (i.e., i) and $q0_i$, may be the second sample corresponding to the line of the first plurality of lines. In equation (6), $p0_j$ may be the first sample corresponding to the line of the second plurality of lines (i.e., j) and $q0_j$ may be the second sample corresponding to the line of the second plurality of lines.

In some examples, the encoder may determine a second value for a line of a third plurality of lines, and a second value for a line of a fourth plurality of lines. In some examples, the encoder may determine the second value for the line of the third plurality of lines and the line of the fourth plurality of lines using a similar method to determining the second value for the first plurality of lines and the second plurality of lines (i.e., by using samples from the blocks on both sides of the edge). In such examples, the third plurality of lines may be perpendicular to a third edge which may be the border between the first block and a fourth block. In such examples, the fourth plurality of lines may be perpendicular to a fourth edge which may be the border between the first block and a fifth block. In some examples, the third edge may be parallel to the first edge, and the fourth edge may be parallel to the second edge. In other words, the encoder may analyze all four edges of the first block.

In some examples, the encoder may determine a second value for each line of the first plurality of lines and a second value for each line of the second plurality of lines. In some examples, the encoder may then determine a sum of the second values for each line of the first plurality of lines and a sum of the second values for each line of the second plurality of lines. For instance, the encoder may determine the sum of the second values for each line of the first plurality of lines in accordance with equation (7) and a sum of the second values for each line of the second plurality of lines in accordance with equation (8).

$$ssum \text{ of second values} = \sum_{i=0}^{n} |p0_i - q0_i| \quad (7)$$

$$\text{sum of second values} = \sum_{j=0}^{n} |p0_j - q0_j| \quad (8)$$

In equation (7), n may correspond to the number of lines included in the first plurality of lines. In equation (8), n may correspond to the number of lines included in the second plurality of lines.

In some examples, the encoder may determine a second value for each line of the third plurality of lines and a second value for each line of the fourth plurality of lines. In some examples, the encoder may then determine a sum of the second values for each line of the third plurality of lines and a sum of the second values for each line of the fourth plurality of lines.

The encoder may then determine, based on the second value for the line of the first plurality of lines and the second value for the line of the second plurality of lines, an average value. For instance, the encoder may add the second value for the first plurality of lines to the second value for the line of the second plurality of lines and divide the total by two to determine the average value.

Based on the determined average value, the encoder may then determine whether or not to encode one or more deblocking parameter offsets. For instance, the encoder may determine that there are minimal artifacts at the edges between the first block and the second block.

If the encoder determines to encode the one or more deblocking parameter offsets, the encoder may signal the determined offsets to the decoder. In some examples, the offsets may be signalled to the decoder for each slice of video data, each PPS of video data, both, or neither. The offsets may be received and applied by a decoder, upon receiving the coded bitstream.

FIG. 1 is a block diagram illustrating an example video encoding and decoding system 10 that may code deblocking filter parameters according to the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, link 16 may correspond to a storage medium that may store the encoded video data generated by source device 12 and that destination device 14 may access as desired via disk access or card access. The storage medium may include any of a variety of locally accessed data storage media such as Blu-ray discs, DVDs, CD-ROMs, flash memory, or any other suitable digital storage media for storing encoded video data. In a further example, link 16 may correspond to a file server or another intermediate storage device that may hold the encoded video generated by source device 12 and that destination device 14 may access as desired via streaming or download. The file server may be any type of server capable of storing encoded video data and transmitting that encoded video data to the destination device 14 Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the file server may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also be stored onto a storage medium or a file server for later access by destination device 14 for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on a data storage medium, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The Joint Collaborative Team on Video Coding (JCT-VC) is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be square or non-square in shape. Syntax data associated with a CU may also describe, for example, partitioning of the CU into one or more TUs according to a quadtree. A TU may be partitioned to be square or non-square in shape.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector.

In general, a TU is used for the transform and quantization processes. A CU having one or more PUs may also include one or more TUs. Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), probability interval partitioning entropy codes (PIPE), or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In addition to signaling the encoded video data in a bitstream to video decoder 30 in destination device 14, video encoder 20 may also decode the encoded video data and reconstruct the blocks within a video frame or picture for use as reference data during the intra- or inter-prediction process for subsequently coded blocks. After dividing a video frame or picture into blocks (e.g., LCUs and sub-CUs thereof), encoding the blocks, and then decoding the blocks, however, perceptible artifacts at edges between the blocks may occur. In order to remove these "blockiness" artifacts, video encoder 20 may apply deblocking filters to the decoded video blocks prior to storage as reference blocks. Similarly, video decoder 30 may be configured to decode video data received in a bitstream from video encoder 20 of source device 12, and apply the same or similar deblocking filters to the decoded video data for purposes of displaying the video data as well as for using the video data as reference data for subsequently decoded video data.

Deblocking filtering performed by a video coding device, such as a video encoder 20 or video decoder 30, prior to storing the data for use as reference data is generally referred to as "in-loop" filtering, in that the filtering is performed within the coding loop. By configuring both video encoder 20 and video decoder 30 to apply the same deblocking techniques, the video coding devices can be synchronized, such that deblocking does not introduce error for subsequently coded video data that uses the deblocked video data as reference data. Deblocking filtering could also be performed "post loop" meaning that unfiltered data is used for prediction and deblocking is only applied to decoded output that itself is not used for prediction.

Video encoder 20 and video decoder 30 are generally configured to determine, for each edge of a video block, including PU and TU edges, whether to apply a deblocking filter to deblock the edge. The video coding devices may be configured to determine whether to deblock an edge based on an analysis of one or more lines of pixels perpendicular to the edge, e.g., a line of 8 pixels. Thus, for example, for a vertical edge, a video coding device may determine whether to deblock the edge by examining four pixels to the left and four pixels to the right of the edge along a common line. The number of pixels selected generally corresponds to the smallest block for deblocking, e.g., 8×8 pixels. In this manner, the line of pixels used for analysis stretches across PU and TU edges of the video block with pixels on either side of the edge, e.g., to the left and right of an edge or above and below an edge. The line of pixels used for analysis of whether to perform deblocking for an edge is also referred to as a set of support pixels, or simply "support."

Video coding devices may be configured to execute deblocking decision functions based on the support for a particular edge. In general, deblocking decision functions are configured to detect high-frequency changes within the support pixels. Typically, when a high frequency change is detected, the deblocking decision function provides an indication that perceptible artifacts are present at the edge and deblocking should occur. The deblocking decision functions may also be configured to determine a type and strength of the deblocking filter to apply to the edge based on the support. The type and strength of the deblocking filter may be indicated by threshold values $t_c$ and $\beta$.

This disclosure also describes techniques for signaling deblocking filter offset parameters (e.g., tc_offset and beta_offset). The deblocking filter parameters define a deblocking filter used to reduce or remove blockiness artifacts from decoded video blocks of the current slice. The deblocking filter parameters include syntax elements generated by the encoder for specific large-sized blocks.

Figure 2:
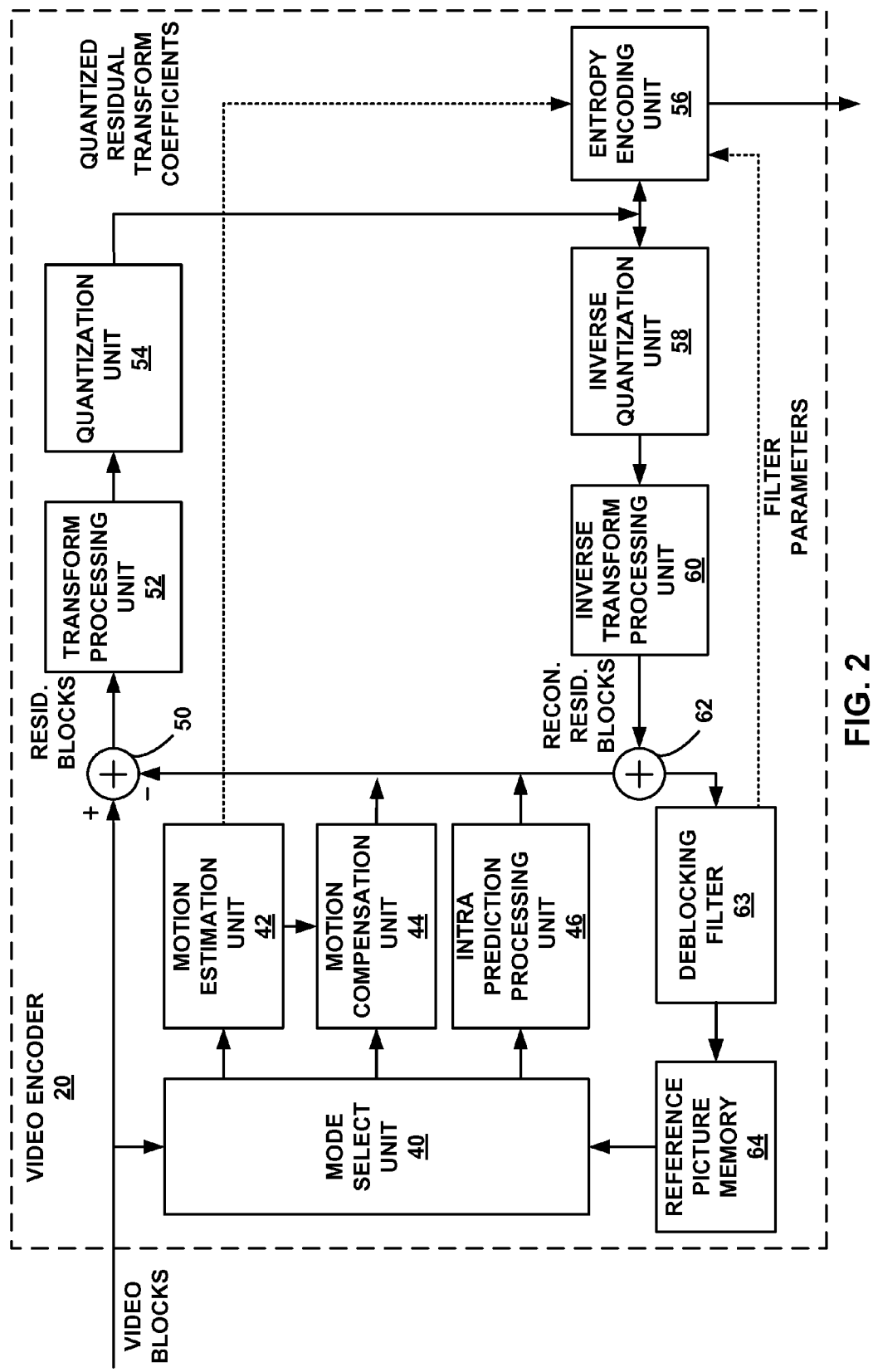
FIG. 2 is a block diagram illustrating an example of a video encoder that may implement the techniques described in this disclosure to encode deblocking filter parameters with reduced bitstream overhead.
Figure 3:
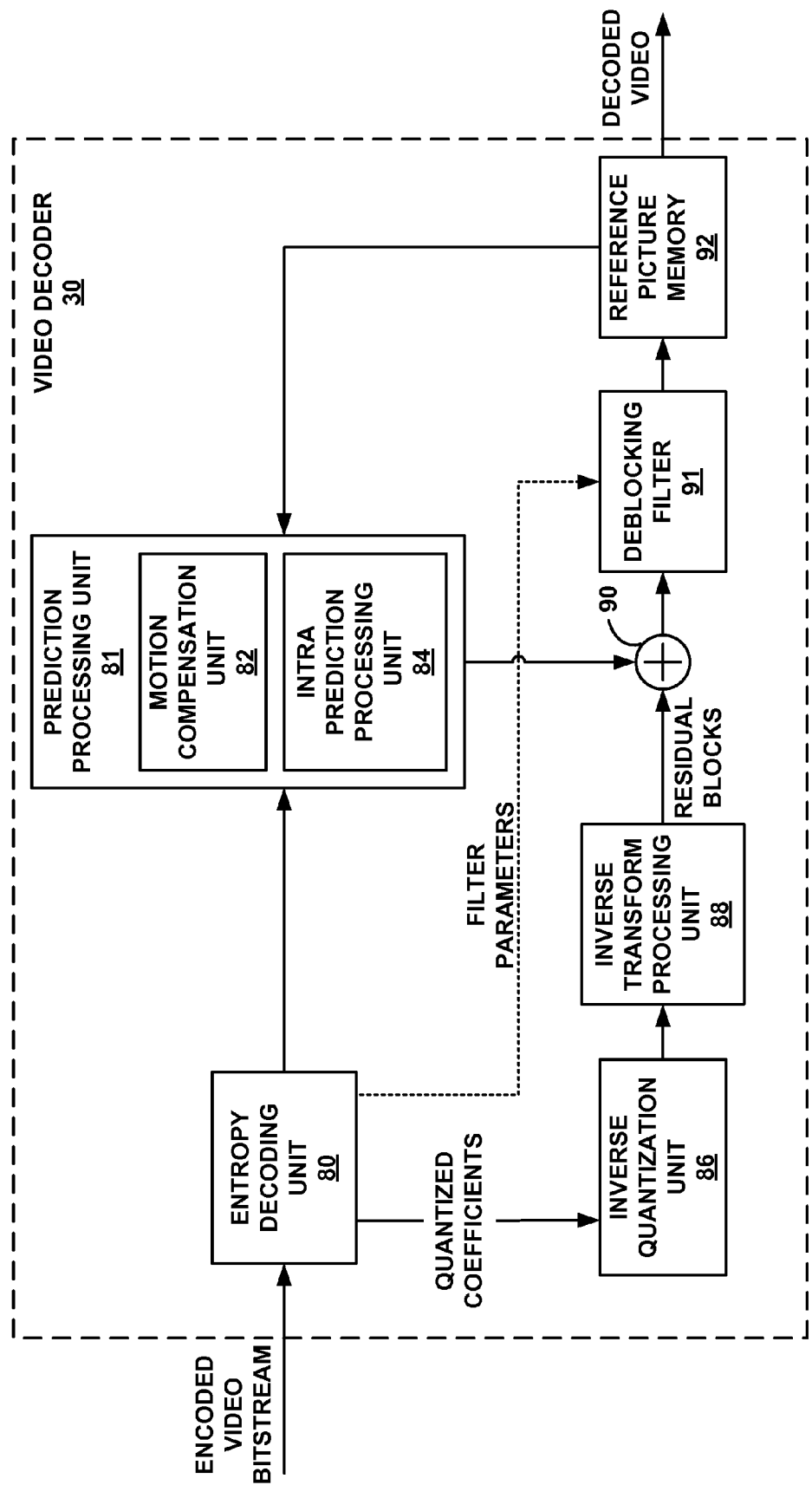
FIG. 3 is a block diagram illustrating an example of a video decoder that may implement the techniques described in this disclosure to decode deblocking filter parameters used to define deblocking filters applied to video slices.

Deblocking filter parameters may be coded in one or more of a picture layer parameter set and a slice header. The picture layer parameter set may comprise either a picture parameter set (PPS) or an adaptation parameter set (APS). The PPS is a picture layer parameter set that contains data unlikely to change between pictures that refer to the PPS. The APS is a picture layer parameter set intended for use with picture-adaptive data that is likely to change from picture to picture. In one example, the APS includes parameters for a deblocking filter, an Adaptive Loop Filter (ALF), and a Sample Adaptive Offset (SAO). Including these parameters in the APS instead of the PPS may reduce a number of bits transmitted for a video sequence because constant PPS data does not need to be repeated when the deblocking filter, ALF, or SAO parameters change. FIGS. 2 and 3 show a deblocking filter, which may be a deblocking unit that performs the techniques described herein. For example, a deblocking unit of a decoder may determine one or more blockiness metrics and encode the metrics (e.g., offset parameters) in a coded bitstream. The deblocking unit of the decoder may then apply the same metrics, upon decoding the coded bitstream. ALF and SAO filters are not shown in FIGS. 2 and 3 for simplicity, although these types of filters may also be used.

FIG. 2 is a block diagram illustrating an example of video encoder 20 that may implement the techniques described in this disclosure to encode deblocking filter parameters with reduced bitstream overhead. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes mode select unit 40, motion estimation unit 42, motion compensation unit 44, intra prediction processing unit 46, reference picture memory 64, summer 50, transform processing unit 52, quantization unit 54, and entropy encoding unit 56. For video block reconstruction, video encoder 20 also includes inverse quantization unit 58, inverse transform processing unit 60, and summer 62. A deblocking filter 63 is also included to filter block boundaries to remove blockiness artifacts from reconstructed video blocks.

As shown in FIG. 2, video encoder 20 receives a current video block within a video slice to be encoded. The slice may be divided into multiple video blocks. Mode select unit 40 may select one of the coding modes, intra or inter, for the current video block based on error results. If the intra or inter modes are selected, mode selection unit 40 provides the resulting intra- or inter-coded block to summer 50 to generate residual block data and to summer 62 to reconstruct the encoded block for use as a reference block within a reference picture stored in reference picture memory 64. Intra prediction processing unit 46 performs intra-predictive coding of the current video block relative to one or more neighboring blocks in the same frame or slice as the current block to be coded to provide spatial compression. Motion estimation unit 42 and motion compensation unit 44 perform inter-predictive coding of the current video block relative to one or more predictive blocks in one or more reference pictures to provide temporal compression.

In the case of inter-coding, motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components.

Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block of a reference picture for storage in reference picture memory 64. The reference block is filtered by deblocking filter 63 in order to remove blockiness artifacts. The reference block is then stored in reference picture memory 64. The reference block may be used by motion estimation unit 42 and motion compensation unit 44 as a reference block to inter-predict a block in a subsequent video frame or picture.

In accordance with the techniques of this disclosure, video encoder 20 includes deblocking filter 63 that selectively filters the output of summer 62. Deblocking filter 63 performs any or all of the techniques of this disclosure to deblock the output of summer 62, that is, the reconstructed video blocks. The reconstructed video blocks, as filtered by deblocking filter 63, may be used by motion estimation unit 42 and motion compensation unit 44 as a reference block to inter-code a block in a subsequently-coded picture.

In particular, deblocking filter 63 receives reconstructed video data from summer 62, which corresponds to predictive data received from either motion compensation unit 44 or intra-prediction unit 46, added to inverse quantized and inverse transformed residual data. In this manner, deblocking filter 63 receives decoded blocks of video data, e.g., CUs of an LCU, LCUs of a slice or frame, PUs of a CU, and/or TUs of a CU. In general, deblocking filter 63 selectively filters the blocks of video data.

Deblocking filter 63 is generally configured to analyze pixels of two neighboring blocks (e.g., two CUs, PUs, or TUs) near an edge between the two blocks to determine whether to deblock the edge. More particularly, deblocking filter 63 may alter the values of the pixels near the edge when a high-frequency change in values is detected. Deblocking filter 63 may also be configured to perform any or all of the techniques of this disclosure.

Deblocking filter 63 may include predefined adapted sets of support, or calculate adapted sets of support on the fly. Deblocking filter 63 may thereby avoid including nearby edges into the computation of the deblocking decisions or deblocking filtering, and to avoid filter result dependencies between nearby edges. Deblocking filter 63 may also skip support adaptation when narrow blocks on either or both sides of an edge under consideration for deblocking are perpendicular to the edge. When at least one narrow non-square partition or transform is parallel to the edge to be deblocked, deblocking filter 63 may adapt deblocking decision functions and/or deblocking filters to avoid interdependencies between filtering of nearby edges and to avoid including nearby edges in the deblocking decisions and filtering.

The boundary strength computation and the deblocking decisions are dependent on threshold values $t_c$ and $\beta$. In some examples, the threshold values $t_c$ and $\beta$ of deblocking filter 63 may be determined based on intermediate values $t_c$ and $\beta$, respectively. Deblocking filter 63 may determine intermediate values $t_c$ and $\beta$ based on a parameter Q. Is some examples, Q may be determined differently for each intermediate value. For example, the value of parameter Q which may be used to determine $t_c$ may be determined in accordance with equation (9), below. As another example, the value of parameter Q which may be used to determine $\beta$ may be determined in accordance with equation (10), below.

$$Q = \mathrm{clip3}(0, \mathrm{MAX\_QP} + 2*(Bs-1) + (\mathrm{slice\_}tc\_ \mathrm{offset\_div2} << 1)) \quad (9)$$

$$Q = \mathrm{clip3}(0, \mathrm{MAX\_QP} + (\mathrm{slice\_beta\_offset\_div2} << 1)) \quad (10)$$

In equation (9), MAX_QP may be the maximum allowable value for quantization parameter QP, Bs may be the boundary filtering strength for the current video block, and slice_tc_offset_div2 may be the parameter offset for threshold value $t_c$. In some examples, MAX_QP may have a value of 51. In equation (10), MAX_QP may be the maximum allowable value for quantization parameter QP, Bs may be the boundary filtering strength for the current video block, and slice_beta_offset_div2 may be the parameter offset for threshold value $\beta$.

Deblocking filter 63 may then determine intermediate values $t_c$ and $\beta$ based on the determined Q values. In some examples, deblocking filter 63 may use the determined Q value to determine intermediate values $t_c$ and $\beta$ with the use of a lookup table, such as Table 1, below.

TABLE 1

| Q | β | $t_c$ |
|---|---|---|
| 0 | 0 | 0 |
| 1 | 0 | 0 |
| 2 | 0 | 0 |
| 3 | 0 | 0 |
| 4 | 0 | 0 |
| 5 | 0 | 0 |
| 6 | 0 | 0 |
| 7 | 0 | 0 |
| 8 | 0 | 0 |
| 9 | 0 | 0 |
| 10 | 0 | 0 |
| 11 | 0 | 0 |
| 12 | 0 | 0 |
| 13 | 0 | 0 |
| 14 | 0 | 0 |
| 15 | 0 | 0 |
| 16 | 6 | 0 |
| 17 | 7 | 0 |
| 18 | 8 | 1 |
| 19 | 9 | 1 |
| 20 | 10 | 1 |
| 21 | 11 | 1 |
| 22 | 12 | 1 |
| 23 | 13 | 1 |
| 24 | 14 | 1 |
| 25 | 15 | 1 |
| 26 | 16 | 1 |
| 27 | 17 | 2 |
| 28 | 18 | 2 |
| 29 | 20 | 2 |
| 30 | 22 | 2 |
| 31 | 24 | 3 |
| 32 | 26 | 3 |
| 33 | 28 | 3 |
| 34 | 30 | 3 |
| 35 | 32 | 4 |
| 36 | 34 | 4 |
| 37 | 36 | 4 |
| 38 | 38 | 5 |
| 39 | 40 | 5 |
| 40 | 42 | 6 |
| 41 | 44 | 6 |
| 42 | 46 | 7 |
| 43 | 48 | 8 |
| 44 | 50 | 9 |
| 45 | 52 | 10 |
| 46 | 54 | 11 |
| 47 | 56 | 13 |
| 48 | 58 | 14 |
| 49 | 60 | 16 |
| 50 | 62 | 18 |
| 51 | 64 | 20 |
| 52 | — | 22 |
| 53 | — | 24 |

Using the respective Q values, deblocking filter 63 may determine threshold values $t_c$ and β. In some examples, deblocking filter 63 may determine $t_c$ in accordance with equation (11), below. In some examples, deblocking filter 63 may determine β in accordance with equation (12), below.

$$t_c = t_c' * (1 << \text{BitDepth} - 8) \quad (11)$$

$$\beta = \beta' * (1 << \text{BitDepth} - 8) \quad (12)$$

This disclosure describes techniques for determining and signaling deblocking filter parameters used to define deblocking filter 63 for a current slice of video data. Deblocking filter 63 determines the deblocking filter parameters and then signals the deblocking filter parameters so that video decoder 30 can apply the same or similar deblocking filter to decoded video blocks. The deblocking filter parameters include syntax elements defined to indicate whether deblocking filtering is enabled or disabled and, if enabled, deblocking filter parameter offsets for threshold values $t_c$ and β. The deblocking filter parameters may further include other parameters determined by the encoder to improve deblocking for one or more block sizes.

Deblocking filter offset parameters may be coded in one or more of a picture layer parameter set and a slice header for signaling to video decoder 30. The picture layer parameter set may comprise either a picture parameter set (PPS) or an adaptation parameter set (APS). The PPS is a picture layer parameter set that contains data unlikely to change between pictures that refer to the PPS. The APS is a picture layer parameter set intended for use with picture-adaptive data that is likely to change from picture to picture.

Entropy encoding unit 56 of video encoder 20 encodes a first syntax element defined to indicate whether deblocking filter parameters are present in both a picture layer parameter set and a slice header for pictures referring to the picture layer parameter set. According to the techniques described in this invention, entropy encoding unit 56 encodes deblocking filter parameter offsets for a current video slice with reduced bitstream overhead by only encoding a second syntax element in the slice header when deblocking filter parameter offsets are present in both the picture layer parameter set and the slice header.

When deblocking filter parameter offsets are not present in both the picture layer parameter set and the slice header, entropy encoding unit 56 may eliminate coding a second syntax element in the slice header defined to indicate which set of deblocking filter parameter offsets is used to define deblocking filter 63 for a current video slice. In the case where deblocking filter parameters offsets are only present in one of the picture layer parameter set or the slice header, deblocking filter 63 is defined for the current video slice based on the set of deblocking filter parameter offsets that are present in either the picture layer parameter set or the slice header. The second syntax element, therefore, is unnecessary to indicate the deblocking filter parameter offsets to video decoder 30 because no decision needs to made between the picture layer parameter set and the slice header regarding which set of deblocking filter parameter offsets to use to define the deblocking filter at video decoder 30.

When the deblocking filter parameter offsets are present in both the picture layer parameter set and the slice header, entropy encoding unit 56 encodes the second syntax element in the slice header defined to indicate whether to use a first set of deblocking parameter offsets included in the picture layer parameter set or a second set of deblocking parameter offsets included in the slice header. In this case, deblocking filter 63 is defined for the current video slice based on one of the first set or the second set of deblocking parameter offsets. The second syntax element, therefore, is necessary to indicate the deblocking filter parameter offsets used to define the deblocking filter 63 in video encoder 20 so that video decoder 30 can apply the same or similar deblocking filter to decoded video blocks.

In some cases, entropy encoding unit 56 may also encode a control present syntax element defined to indicate whether any deblocking filter control syntax elements are present in either the picture layer parameter set or the slice header. The control present syntax element may be signaled in the picture layer parameter set or from a higher-layer parameter set, e.g., a sequence parameter set (SPS). The deblocking filter control syntax elements comprise the first and second syntax elements described above. Entropy encoding unit 56, therefore, encodes the control present syntax element prior to encoding the first syntax element. If no deblocking filter control syntax elements are present, video encoder 20 notifies video decoder 30 and does not encode the first or second syntax elements. In this case, video encoder 20 may use default deblocking filter parameters to define deblocking filter 63 applied to the decoded video blocks.

In other cases, entropy encoding unit 56 may encode a deblocking filter enabled syntax element defined to indicate whether deblocking filter 63 is enabled for one or more pictures of a video sequence prior to encoding the first syntax element. The deblocking filter enabled syntax element may be signaled in a higher-layer parameter set, e.g., a sequence parameter set (SPS). If deblocking filter 63 is disabled for the video sequence, video encoder 20 notifies video decoder 30 and does not encode the first or second syntax elements because deblocking filter 63 is not applied to the decoded video blocks. In this case, video encoder 20 also does not encode a control present syntax element.

In one example, the first syntax element comprises an override enabled flag coded in a PPS for a given picture. In this case, a first set of deblocking filter parameters is coded in the PPS and the override enabled flag indicates whether a second set of deblocking filter parameters is present in a slice header for one or more slices of the given picture that could be used to override the parameters from the PPS. In addition, the second syntax element comprises an override flag that may be coded in the slice header. When the override enabled flag in the PPS indicates that the second set of deblocking filter parameters is present in the slice header, entropy encoding unit 56 encodes the override flag to indicate to video decoder 30 whether to use the first set of deblocking filter parameters in the PPS or to override the first set of deblocking filter parameters with the second set of deblocking filter parameters included in the slice header to define the deblocking filter at video decoder 30. Otherwise, when the override enabled flag in the PPS indicates that only the first set of deblocking filter parameters in the PPS is present, entropy encoding unit 56 eliminates encoding of the override flag in the slice header. The specific syntax elements for this example are described in more detail below with respect to video decoder 30 in FIG. 3.

In another example, the first syntax element comprises an inherit enabled flag coded in a SPS and/or an APS for a given picture. In this case, a second set of deblocking filter parameters is coded in the slice header and the inherit enabled flag indicates whether a first set of deblocking filter parameters is present in the APS that could be inherited by the slice header. The second syntax element comprises an inherit flag that may be coded in the slice header. When the inherit enabled flag in the SPS and/or APS indicates that the first set of deblocking filter parameters is present in the APS, entropy encoding unit 56 encodes the inherit flag to indicate to video decoder 30 whether to use the second set of deblocking filter parameters in the slice header or to inherit the first set of deblocking filter parameters in the APS to define the deblocking filter at video decoder 30. Otherwise, when the inherit enabled flag in the SPS and/or APS indicates that only the second set of deblocking filter parameters in the slice header is present, entropy encoding unit 56 eliminates encoding of the inherit flag in the slice header. The specific syntax elements for this example are described in more detail below with respect to video decoder 30 in FIG. 3.

In accordance with one or more techniques of this disclosure, deblocking filter 63 may determine whether or not to encode one or more deblocking parameter offset values. For instance, a blockiness metric may be integrated in encoder 20, which may analyze the large block artifacts in the video data and may determine appropriate deblocking offset parameters that may be signalled to a video decoder.

For example, deblocking filter 63 may determine one or more blockiness metrics and cause entropy encoding unit 56 to encode the metrics (e.g., offset parameters) in a coded bitstream. The deblocking unit of the decoder may then apply the same metrics, upon decoding the coded bitstream.

In some examples, deblocking filter 63 may analyze the vertical edge or the horizontal edge of a block. In some examples, deblocking filter 63 may analyze both the vertical edge and horizontal edge of a block (e.g., a 32×32 block grid) in the picture. In general, deblocking filter 63 may analyze a block of any size. In some examples, deblocking filter 63 may analyze a block having a size corresponding to the maximum transform size may be analyzed.

In some examples, deblocking filter 63 may determine a first value for a line of a first plurality of lines. The line of the first plurality of lines may be perpendicular to a first edge of the block. For instance, deblocking filter 63 may determine a first intermediate value $dp_i$ in accordance with equation (1), above. In some examples, deblocking filter 63 may determine the first intermediate value based on a first set of sample values of video data corresponding to the line. In some examples, the first set of sample values may be included in the block. Deblocking filter 63 may also determine a second intermediate value $dq_i$ in accordance with equation (2), above. In some examples, deblocking filter 63 may determine the second intermediate value based on a second set of sample values of video data corresponding to the line. In some examples, the second set of sample values may be included in a different, neighboring block. In some examples, deblocking filter 63 may then determine the first value $d_i$ in accordance with equation (3), above.

Deblocking filter 63 may then determine whether the first value satisfies a threshold. For instance, deblocking filter 63 may determine that the first value satisfies a threshold where the first value is greater than a first threshold and lesser than a second threshold. In some examples, deblocking filter 63 may scale first value prior to determining whether or not the first value satisfies a threshold. In some examples, deblocking filter 63 may perform the scaling and determining in accordance with equation (4), above. In other words, the condition defined by equations (1)-(4) may be checked at each line i perpendicular to the edge.

If deblocking filter 63 determines that the first value satisfies the threshold, deblocking filter 63 may determine a second value for the line of the plurality of lines and determine a second value for a line of a second plurality of lines. In some examples, deblocking filter 63 may determine the second value for the line of the first plurality of lines based on a first sample of video data included in the first block and a second sample of video data included in the second block. For instance, deblocking filter 63 may determine the second value for the line of the first plurality of lines in accordance with equation (5), above. In some examples, the second plurality of lines may be perpendicular to a second edge of the block. In some examples, the first edge may be a vertical edge or a horizontal edge. In some examples, the second edge may be a different edge of the vertical edge or the horizontal edge. In other words, where the first edge is a vertical edge, the second edge is a horizontal edge and vice versa. In some examples, the second edge may be the border between the first block and the third block. In some examples, deblocking filter 63 may determine the second value for the line of the second plurality of lines based on a third sample of video data included in the first block and a fourth sample of video data included in a third block. For instance, deblocking filter 63 may determine the second value for the line of the second plurality of lines in accordance with equation (6), above.

In some examples, deblocking filter 63 may determine a second value for each line of the first plurality of lines and a second value for each line of the second plurality of lines. In some examples, deblocking filter 63 may then determine a sum of the second values for each line of the first plurality of lines and a sum of the second values for each line of the second plurality of lines. For instance, deblocking filter 63 may determine the sum of the second values for each line of the first plurality of lines in accordance with equation (7), above, and a sum of the second values for each line of the second plurality of lines in accordance with equation (8), above. In other words, deblocking filter 63 may accumulate the computed step size and for the entire vertical/horizontal edge that is being analyzed.

In some examples, deblocking filter 63 may adjust the second value for the line of the first plurality of lines and/or the second value for the line of the second plurality of lines. In other words, deblocking filter 63 may scale and/or normalize the second values. For example, if the first edge is a horizontal edge, deblocking filter 63 may adjust the second value for the line of the first plurality of lines based on a quantity of horizontal edges of the slice and a width of the slice, and adjust the second value for the line of the second plurality of lines based on a quantity of vertical edges of the slice and a height of the slice. As another example, if the first edge is a vertical edge, deblocking filter 63 may adjust the second value for the line of the first plurality of lines based on a quantity of vertical edges of the slice and a height of the slice, and adjust the second value for the line of the second plurality of lines based on a quantity of horizontal edges of the slice and a width of the slice. In some examples, such as where deblocking filter 63 determines a sum of the second values for each line of the first plurality of lines, deblocking filter 63 may adjust the sum of the second values for each line of the first plurality of lines. In some examples, such as where deblocking filter 63 determines a sum of the second values for each line of the second plurality of lines, deblocking filter 63 may adjust the sum of the second values for each line of the second plurality of lines. In some examples, the quantity of horizontal edges may be the number of blocks having horizontal edges along a horizontal edge of the slice. In some examples, the quantity of vertical edges may be the number of blocks having vertical edges along a vertical edge of the slice. In some examples, the width of the slice may correspond to the number of pixels along a horizontal line in the slice. In some examples, the height of the slice may correspond to the number of pixels along a vertical line in the slice. In some example, deblocking filter 63 may adjust the second values by multiplying the second values by a multiplication factor. In some examples, the multiplication factor may be 2048. In some examples, factors other than the number of edges and/or the width/height may be used.

Deblocking filter 63 may then determine an average value. In some examples, deblocking filter 63 may determine the average value based on the second value for the line of the first plurality of lines and the second value for the line of the second plurality of lines. For instance, deblocking filter 63 may add the second value for the first plurality of lines to the second value for the line of the second plurality of lines and divide the total by two to determine the average value. In some examples, deblocking filter 63 may determine the average value based on the adjusted second values. In some examples, deblocking filter 63 may determine the average value based on the sum of the second values for each line of the first plurality of lines and the sum of the second values for each line of the second plurality of lines. In some examples, deblocking filter 63 may determine the average value based on the adjusted sums of the second values.

Based on the determined average value, deblocking filter 63 may then determine whether or not to encode one or more deblocking parameter offsets. As one example, deblocking filter 63 may determine not to encode one or more deblocking parameter offsets where there are minimal artifacts at the edges between the first block and the second block. In some examples, deblocking filter 63 may determine the one or more deblocking parameter offsets based on the average value if the average value is greater than a threshold. In some examples, deblocking filter 63 may not determine the one or more deblocking parameter offsets based on the average value if the average value is not greater than the threshold.

If deblocking filter 63 determines to encode the one or more deblocking parameter offsets, deblocking filter 63 may determine the one or more deblocking parameter offsets. In some examples, the deblocking parameter offsets may include a $t_c$ offset value and a beta offset value. In some examples, deblocking filter 63 may calculate the $t_c$ offset value in accordance with equation (13), below. In some examples, deblocking filter 63 may calculate the beta offset value in accordance with equation (14), below.

$$T_c\_\text{offset}=2*\text{Clip3}(\text{threshold3},\text{threshold4},\text{avg}/\text{value2}) \quad (13)$$

$$\text{Beta\_offset}=2*\text{Clip3}(\text{threshold5},\text{threshold6},\text{avg}/\text{value3}) \quad (14)$$

In equation (13), avg may be the average value determined by deblocking filter 63, threshold3 and threshold4 may be threshold values, and value2 may be a scaling factor. In some examples threshold3 may have a value of two. In some examples threshold4 may have a value of six. In some examples threshold5 may have a value of two. In some examples threshold6 may have a value of six. In equation (14), avg may be the average value determined by deblocking filter 63, threshold5 and threshold6 may be threshold values, and value3 may be a scaling factor. In some examples, dividing avg by value2 may be equivalent to right shifting avg by nine (i.e., avg>>9). In some examples, dividing avg by value3 may be equivalent to right shifting avg by nine (i.e., avg>>9). In equations (13) and (14), the function Clip3 may be defined according to equation (15), below.

$$\text{Clip3}(x, y, z) = \begin{cases} x; & z < x \\ y; & z > y \\ z; & \text{else} \end{cases} \quad (15)$$

In some examples, encoder 20 may signal the determined offsets to the decoder. For instance, encoder 20 may signal the determined offsets to the decoder via entropy encoding unit 56. In some examples, encoder 20 may signal the offsets to the decoder for each slice of video data. In some examples, encoder 20 may signal the offsets to the decoder for each PPS of video data. The offsets may be received and applied by a decoder, upon receiving the coded bitstream.

FIG. 3 is a block diagram illustrating an example of a video decoder 30 that may implement the techniques described in this disclosure to decode deblocking filter parameters used to define deblocking filters applied to video slices. In the example of FIG. 3, video decoder 30 includes an entropy decoding unit 80, a prediction processing unit 81, an inverse quantization unit 86, an inverse transform processing unit 88, a summer 90, a deblocking filter 91, and a reference picture memory 92. Prediction processing unit 81 includes motion compensation unit 82 and intra prediction processing unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. When the represented video blocks in the bitstream include compressed video data, entropy decoding unit 80 of video decoder 30 entropy decodes the bitstream to generate quantized coefficients, motion vectors, and other syntax elements. Entropy decoding unit 80 forwards the motion vectors and other syntax elements to prediction processing unit 81. Video decoder 30 may receive the syntax elements at a sequence level, a picture level, a slice level and/or a video block level. In some cases, entropy decoding unit 80 decodes deblocking filter control syntax elements, including deblocking filter parameter offsets, to define a deblocking filter 91 for a given video slice and/or a given PPS.

When the video slice is coded as an intra-coded (I) slice, intra prediction processing unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. Motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform processing unit 88 with the corresponding predictive blocks generated by motion compensation unit 82. Summer 90 represents the component or components that perform this summation operation. A deblocking filter 91 is applied to filter the blocks received from summer 90 in order to remove blockiness artifacts. The decoded video blocks in a given picture are then stored in reference picture memory 92, which stores reference pictures used for subsequent motion compensation. Reference picture memory 92 also stores decoded video for later presentation on a display device, such as display device 32 of FIG. 1.

Deblocking filter 91 in video decoder 30 filters certain TU and PU edges of a decoded video block based on a result from a boundary strength computation and deblocking decisions. The boundary strength computation and the deblocking decisions are dependent on threshold values $t_c$ and $\beta$, which may be signaled to video decoder 30 from video encoder 20 using syntax elements. Deblocking filter 91 may alter the values of pixels near a given edge of a video block in order to remove blockiness artifacts perceptible at the edge. Deblocking filter 91 may be similar to deblocking filter 63 from FIG. 2 in that deblocking filter 91 may be configured to perform any or all of the techniques described with respect to deblocking filter 63. The encoder side may actually determine parameters and apply the parameters, while the decoder side may receive and apply the parameters that were determined by the encoder.

In accordance with the techniques of this disclosure, entropy decoding unit 80 in video decoder 30 decodes deblocking filter control syntax elements included in the bitstream received from video encoder 20. The deblocking filter control syntax elements include deblocking filter parameters that indicate whether deblocking filtering is enabled or disabled and, if enabled, deblocking filter parameter offsets for threshold values $t_c$ and $\beta$. Video encoder 30 determines the deblocking filter parameters to be used for deblocking filter 91 from the deblocking filter control syntax elements (e.g., tc_offset_div2 and beta_offset_div2) included in the bitstream. Video decoder 30 then defines deblocking filter 91 based on the deblocking filter parameters to operate the same or similar to deblocking filter 63 in video encoder 20 in order to decode the video blocks in the bitstream.

This disclosure describes techniques for selected signaling deblocking filter parameters. Deblocking filter parameters may be coded in one or more of a picture layer parameter set and a slice header for signaling to video decoder 30. The picture layer parameter set may comprise either a picture parameter set (PPS) or an adaptation parameter set (APS). The PPS is a picture layer parameter set that contains data unlikely to change between pictures that refer to the PPS. The APS is a picture layer parameter set intended for use with picture-adaptive data that is likely to change from picture to picture.

Entropy decoding unit 80 of video encoder 30 decodes a first syntax element defined to indicate whether deblocking filter parameters are present in both a picture layer parameter set and a slice header for pictures referring to the picture layer parameter set. According to the techniques described in this invention, entropy decoding unit 80 only decodes a second syntax element in the slice header when deblocking filter parameters are present in both the picture layer parameter set and the slice header.

When deblocking filter parameters are not present in both the picture layer parameter set and the slice header, entropy decoding unit 80 determines that a second syntax element defined to indicate which set of deblocking filter parameters to use to define deblocking filter 91 for a current video slice is not present in the slice header to be decoded. In the case where deblocking filter parameters are only present in one of the picture layer parameter set or the slice header, deblocking filter 91 is defined for the current video slice based on the set of deblocking filter parameters that are present in either the picture layer parameter set or the slice header. The second syntax element, therefore, is unnecessary because video decoder 30 does not need to decide which set of deblocking filter parameters to use to define deblocking filter 91 in video decoder 30.

When the deblocking filter parameters are present in both the picture layer parameter set and the slice header, entropy decoding unit 80 decodes the second syntax element in the slice header defined to indicate whether to use a first set of deblocking parameters included in the picture layer parameter set or a second set of deblocking parameters included in the slice header. In this case, deblocking filter 91 is defined for the current video slice based on one of the first set or the second set of deblocking parameters. The second syntax element, therefore, is necessary so that video decoder 30 knows which set of deblocking filter parameters to use to define deblocking filter 91 to be the same or similar to deblocking filter 63 in video encoder 20.

In some cases, entropy decoding unit 80 may also decode a control present syntax element defined to indicate whether any deblocking filter control syntax elements are present in either the picture layer parameter set or the slice header. The control present syntax element may be decoded from the picture layer parameter set or from a higher-layer parameter set, e.g., a sequence parameter set (SPS). The deblocking filter control syntax elements comprise the first and second syntax elements described above. Entropy decoding unit 80, therefore, decodes the control present syntax element prior to decoding the first syntax element. If the control present syntax element indicates that no deblocking filter control syntax elements are present, video decoder 30 knows that it does not need to decode the first or second syntax elements because the first and second syntax elements are not present in the bitstream to be decoded. In this case, video decoder 30 may use default deblocking filter parameters to define deblocking filter 91 applied to the decoded video blocks.

In other cases, entropy decoding unit 80 may decode a deblocking filter enabled syntax element defined to indicate whether deblocking filter 91 is enabled for one or more pictures of a video sequence prior to decoding the first syntax element. The deblocking filter enabled syntax element may be decoded from a higher-layer parameter set, e.g., a sequence parameter set (SPS). If deblocking filter 91 is disabled for the video sequence, video decoder 30 knows that it does not need to decode the first or second syntax elements because deblocking filter 91 is not applied to the decoded video blocks. In this case, video decoder 30 also does not need to decode a control present syntax element.

In one example, the first syntax element comprises an override enabled flag coded in a PPS for a given picture. In this case, a first set of deblocking filter parameters is coded in the PPS and the override enabled flag indicates whether a second set of deblocking filter parameters is present in a slice header for one or more slices of the given picture that could be used to override the parameters from the PPS. In addition, the second syntax element comprises an override flag that may be coded in the slice header. When the override enabled flag in the PPS indicates that the second set of deblocking filter parameters is present in the slice header, entropy decoding unit 80 decodes the override flag to determine whether to use the first set of deblocking filter parameters in the PPS or to override the first set of deblocking filter parameters with the second set of deblocking filter parameters included in the slice header to define deblocking filter 91. Otherwise, when the override enabled flag in the PPS indicates that only the first set of deblocking filter parameters in the PPS is present, entropy decoding unit 80 determines that the override flag is not present in the slice header to be decoded.

These offsets may be signalled in a coded bitstream once per slice, once per picture, or in other intervals. This signaling may be done in a slice header or other type of parameter set or signaling mechanism within a coded bitstream.

Figure 4:
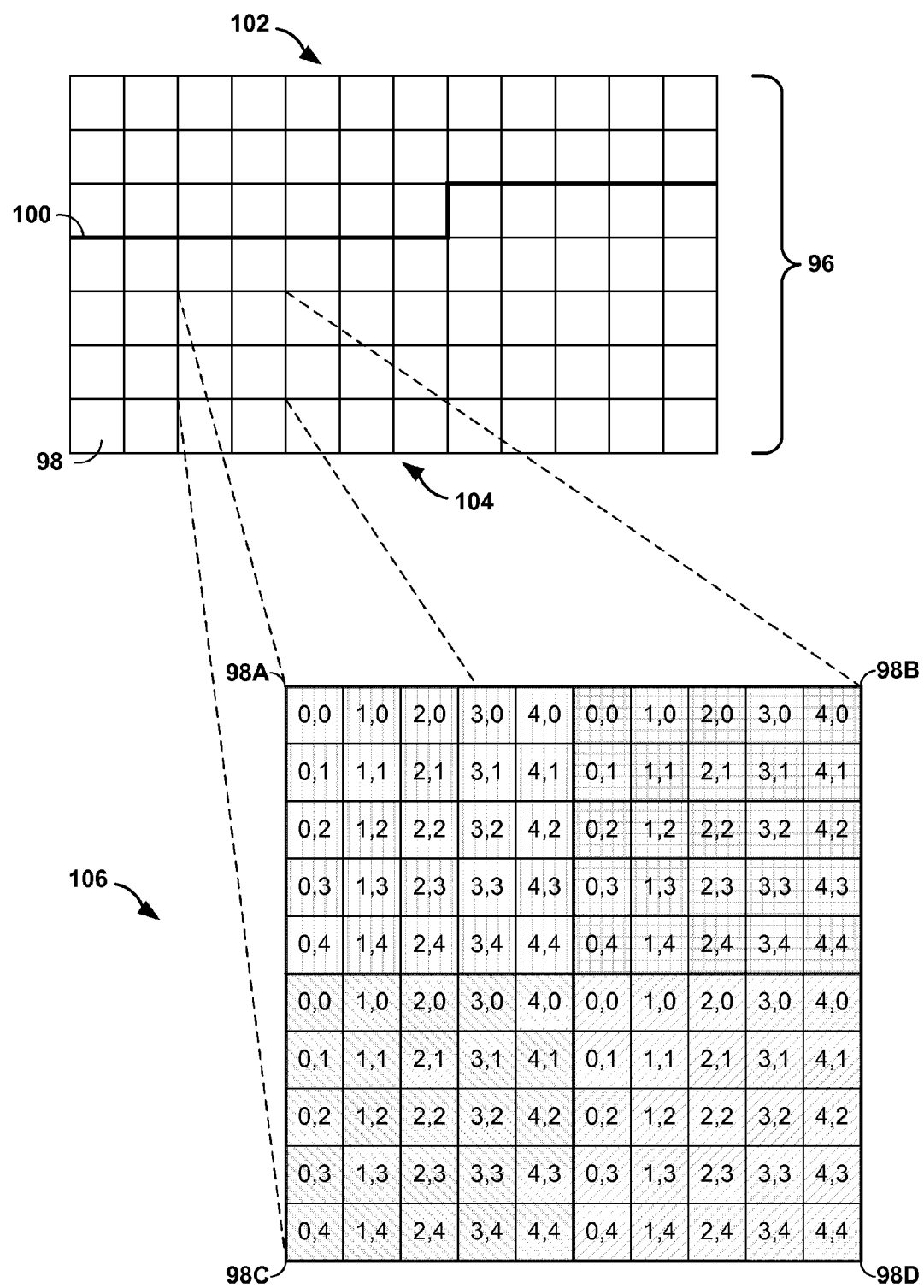
FIG. 4 is a block diagram illustrating example of blocks of video data which may be used to encode deblocking filter parameters in accordance with one or more techniques of this disclosure.

FIG. 4 is a block diagram illustrating example video data for which an encoder may encode deblocking filter parameters in accordance with one or more techniques of this disclosure. As illustrated in FIG. 4, video data 96 may include a plurality of blocks, such as block 98. In some examples, video data 96 may be divided into slices. In the example of FIG. 4, slice boundary 100 divides video data 96 into first slice 102 and second slice 104.

As shown in detailed view 106, block 98A, block 98B, block 98C, and block 98D (collectively, "blocks 98") may each include a plurality of pixels. In some examples, each pixel may be identified by one or more coordinates. For instance, the top left pixel of each of blocks 98 may be identified by the coordinates (0,0). In particular, the top left pixel of block 98A may be identified by the coordinates A(0,0). While illustrated in FIG. 4 as each being the same shape (i.e., square) and including the same number of pixels (i.e., 25 pixels), in some examples blocks 98 may be of varying shapes and include different numbers of pixels.

In accordance with one or more techniques of this disclosure, an encoder may determine a first value for a line of a first plurality of lines that may be perpendicular to a first edge of a block of video data. In the example of FIG. 4, the first block may be block 98D, the line of the first plurality of lines may be the line that includes the left most column of block 98D and block 98B, and the first plurality of lines may be the columns of block 98D and block 98B. In other words, the line of the first plurality of lines may include pixels B(0,0), B(0,1), B(0,2), B(0,3), B(0,4), A(0,0), A(0,1), A(0,2), A(0,3), and A(0,4).

In some examples, an encoder may determine the first value for the line of the first plurality of lines by determining a first intermediate value based on a first set of sample values of video data corresponding to the first line of the plurality of lines and determining a first intermediate value based on a first set of sample values of video data corresponding to the first line of the plurality of lines. In the example of FIG. 4, the first set of sample values may include D(0,2), D(0,1), and D(0,0) and the second set of sample values may include B(0,4), B(0,3), and B(0,2). In some examples, the encoder may apply equation (1), above, to determine the first intermediate value. The application of equation (1) to the example of FIG. 4 may yield equation (16), below. In some examples, the encoder may apply equation (2), above, to determine the second intermediate value. The application of equation (2) to the example of FIG. 4 may yield equation (17), below. In some examples, the encoder may apply equation (3), above to determine the first value of the line (i.e., i) of the first plurality of lines. The application of equation (3) to the example of FIG. 4 may yield equation (18), below.

$$dp_i = |D(0,2)_i - 2D(0,1)_i + D(0,0)_i| \tag{16}$$

$$dq_i = |B(0,4)_i - 2B(0,3)_i + B(0,2)_i| \tag{17}$$

$$d_i = |D(0,2)_i - 2D(0,1)_i + D(0,0)_i| + |B(0,4)_i - 2B(0,3)_i + B(0,2)_i| \tag{18}$$

In some examples, either the first set or the second set may include additional sample values. For instance, the first set may further include D(0,4) and the second set may further include B(0,0). The encoder may then determine whether the determined first value satisfies one or more thresholds. In some examples, the encoder may determine that the first value satisfies the one or more thresholds if the first value is greater than a first threshold and lesser than a second threshold. In some examples, the encoder may scale the first value prior to determining threshold satisfaction. For instance, the encoder may apply equation (4), above, to determine whether or not the first value (i.e., $d_i$) satisfies the one or more thresholds. The application of equation (4) to the example of FIG. 4 may yield equation (19), below.

$$\text{threshold1} < \text{scalingvalue} * d_i < \text{threshold2} \tag{19}$$

In some examples, threshold1 may have the value of two. In some examples, scalingvalue may have the value of two. In some examples, threshold2 may have the value of one of the deblocking parameters, such as β, divided by four.

If the first value of the line of the first plurality of lines satisfies the one or more thresholds, the encoder may determine a second value for the line of the first plurality of lines and determine a second value for a line of a second plurality of lines. In some examples, the second plurality of lines may be perpendicular to a second edge of the block grid. In some examples, the first edge may be a vertical edge or a horizontal edge. In some examples, the second edge may be a different edge of the vertical edge or the horizontal edge. In other words, where the first edge is a vertical edge, the second edge is a horizontal edge and vice versa.

In the example of FIG. 4, the first block may be block 98D, the line of the second plurality of lines may be the line that includes the middle row of block 98D and block 98C, and the second plurality of lines may be the rows of block 98D and block 98C. In other words, the line of the second plurality of lines may include pixels C(0,2), C(1,2), C(2,2), C(3,2), C(4,2), A(0,2), A(1,2), A(2,2), A(3,2), and A(4,2).

In the example of FIG. 4, the encoder may determine the second value for the first plurality of lines in accordance with equations (5) and (6) and/or (7) and (8). The application of equation (5) to the example of FIG. 4 may yield equation (20), below. The application of equation (6) to the example of FIG. 4 may yield equation (21), below.

$$\text{second value} = |D(0,0) - B(0,4)| \tag{20}$$

$$\text{second value} = |D(0,2) - C(4,2)| \tag{21}$$

The application of equation (7) to the example of FIG. 4 may yield equation (22), below. The application of equation (8) to the example of FIG. 4 may yield equation (23), below.

$$\text{sum of second values} = \sum_{i=0}^{4} |D(i,0) - B(i,4)| \tag{22}$$

$$\text{sum of second values} = \sum_{j=0}^{4} |D(0,j) - C(4,j)| \tag{23}$$

In some examples, the encoder may then adjust the second values. In some examples, where the first edge is a horizontal edge, the encoder may adjust the second value for the line of the first plurality of lines (or the sum of the second values for the first plurality of lines) based on a quantity of horizontal edges of the slice and a width of the slice. In some examples, where the first edge is a vertical edge, the encoder may adjust the second value for the line of the first plurality of lines (or the sum of the second values for the first plurality of lines) based on a quantity of vertical edges of the slice and a height of the slice. In the example of FIG. 4, because the first edge (i.e., the border between block 98D and block 98B) is a horizontal edge, the encoder may adjust the second value for the line of the first plurality of lines based on the quantity of horizontal edges of the slice and the width of the slice. As illustrated in FIG. 4, second slice 104 may have 12 horizontal edges and a width of 60 pixels. In some examples, where the first edge is a horizontal edge, the encoder may adjust the second value for the line of the second plurality of lines (or the sum of the second values for the second plurality of lines) based on a quantity of vertical edges of the slice and a height of the slice. In some examples, where the first edge is a vertical edge, the encoder may adjust the second value for the line of the second plurality of lines (or the sum of the second values for the first plurality of lines) based on the quantity of horizontal edges of the slice and the width of the slice. In the example of FIG. 4, because the first edge (i.e., the border between block 98D and block 98B) is a horizontal edge, the encoder may adjust the second value for the line of the second plurality of lines based on the quantity of vertical edges of the slice and the height of the slice. As illustrated in FIG. 4, second slice 104 may have 5 horizontal edges and a width of 25 pixels.

The encoder may then determine, based on the second value for the line of the first plurality of lines and the second value for the line of the second plurality of lines, an average value. For instance, the encoder may add the second value for the first plurality of lines to the second value for the line of the second plurality of lines and divide the total by two to determine the average value. In some examples, the encoder may add the sum of the second values for the first plurality of lines to the sum of the second values for the second plurality of lines and divide the total by two to determine the average value.

As discussed above, based on the determined average value, the encoder may then determine whether or not to encode one or more deblocking parameter offsets.

Figure 5:
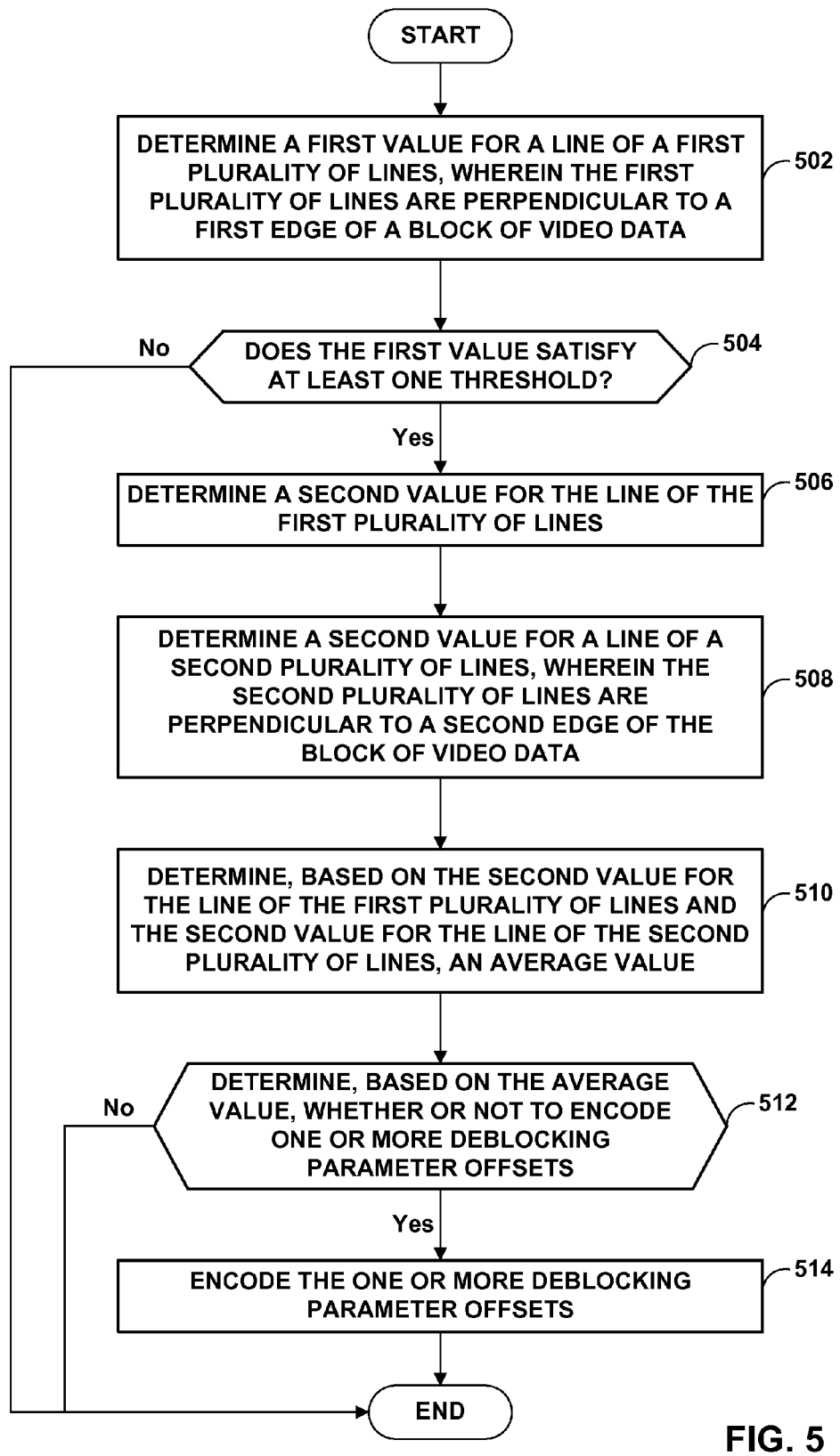
FIG. 5 is a flow chart illustrating an example video encoding method according one example of this disclosure.

FIG. 5 is a flow diagram illustrating an example video encoding method according one example of this disclosure. For purposes of illustration, the techniques of FIG. 5 are described within the context of encoder 20 of FIG. 1 and FIG. 2, although encoders having configurations different than that of encoder 20 may perform the techniques of FIG. 5.

In accordance with one or more techniques of this disclosure, encoder 20 may determine a first value for a line of a first plurality of lines, wherein the first plurality of lines are perpendicular to a first edge of a block of video data (502).

Encoder 20 may then determine whether or not the first value satisfies a threshold (504). In response to determining that the first value satisfies at least one threshold, encoder 20 may determine a second value for the line of the first plurality of lines (506). Also in response to determining that the first value satisfies the at least one threshold, encoder 20 may determine a second value for a line of a second plurality of lines, wherein the second plurality of lines are perpendicular to a second edge of the block of video data (508).

Encoder 20 may then determine, based on the second value for the line of the first plurality of lines and the second value for the line of the second plurality of lines, an average value (510). Encoder 20 may then determine, based on the average value, whether or not to encode one or more deblocking parameter offsets (512). In response to determining to encode the one or more deblocking parameter offsets, encoder 20 may encode the one or more deblocking parameter offsets (514).

Example 1

A method for encoding video data comprising: determining a first value for a line of a first plurality of lines, wherein the first plurality of lines are perpendicular to a first edge of a block of the video data; in response to determining that the first value satisfies at least one threshold: determining a second value for the line of the first plurality of lines; and determining a second value for a line of a second plurality of lines, wherein the second plurality of lines are perpendicular to a second edge of the block of video data, and wherein the first edge is a vertical edge or a horizontal edge, and wherein the second edge is a different edge of the vertical edge or the horizontal edge; determining, based on the second value for the line of the first plurality of lines and the second value for the line of the second plurality of lines, an average value; and determining, based on the average value, whether or not to encode one or more deblocking parameter offsets.

Example 2

The method of example 1, wherein the block is a first block, wherein the first edge is the border between the first block and a second block, and wherein determining the first value for the line of the first plurality of lines comprises: determining a first intermediate value based on a first set of sample values of video data corresponding to the line of the first plurality of lines, wherein the first set of sample values are included in the first block; determining a second intermediate value based on a second set of sample values of video data corresponding to the line of the first plurality of lines, wherein the second set of sample values are included in the second block; and determining the first value based on the first intermediate value and the second intermediate value.

Example 3

The method of any combination of examples 1-2, wherein the first intermediate value is determined approximately according to the following equation: $dp_i=|p2_i-2p1_i+p0_i|$, wherein $dp_i$ is the first intermediate value, wherein $p2_i$, $p1_i$, and $p0_i|$, are sample values included in the first set of sample values, wherein the second intermediate value is determined approximately according to the following equation: $dq_i=|q0_i-2q1_i+q2_i|$, wherein $dq_i$ is the second intermediate value, wherein $q0_i$, $q1_i$, and $q2_i$ are sample values included in the second set of sample values, wherein the first value is determined approximately according to the following equation: $d_i=(dp_i+dq_i)$, and wherein $d_i$ is the first value.

Example 4

The method of any combination of examples 1-3, wherein determining that the first value satisfies at least one threshold comprises: determining that the first value is greater than a first threshold and lesser than a second threshold.

Example 5

The method of any combination of examples 1-4, wherein determining the second value for the line of the first plurality of lines comprises: determining a second value for each line of the first plurality of lines; and determining a sum of the second values for each line of the first plurality of lines, wherein determining the second value for the line of the second plurality of lines comprises: determining a second value for each line of the second plurality of lines; and determining a sum of the second values for each line of the second plurality of lines, wherein determining the average value comprises: determining, based on the sum of the second values for each line of the first plurality of lines and the sum of the second values for each line of the second plurality of lines, the average value.

Example 6

The method of any combination of examples 1-5, wherein the block is a first block, wherein the first edge is the border between the first block and a second block, wherein the second edge is the border between the first block and a third block, wherein a third edge is the border between the first block and a fourth block, wherein a fourth edge is the border between the first block and a fifth block, wherein the third edge is parallel to the first edge, wherein the fourth edge is parallel to the second edge, the method further comprising: determining a second value for each line of a third plurality of lines, wherein the third plurality of lines are perpendicular to the third edge; determining a sum of the second values for each lines of the third plurality of lines; determining a second value for each line of a fourth plurality of lines, wherein the fourth plurality of lines are perpendicular to the fourth edge; and determining a sum of the second values for each lines of the fourth plurality of lines, wherein determining the average value comprises: determining, based on the sum of the second values for each line of the first plurality of lines, the sum of the second values for each line of the second plurality of lines, the sum of the second values for each line of the third plurality of lines, the sum of the second values for each line of the fourth plurality of lines, the average value.

Example 7

The method of any combination of examples 1-6, wherein the block is a first block, wherein the first edge is the border between the first block and a second block, wherein the second edge is the border between the first block and a third block, wherein determining the second value for the line of the first plurality of lines comprises: determining the second value for the line of the first plurality of lines based on a first sample of video data included in the first block and a second sample of video data included in the second block, wherein determining the second value for the line of the second plurality of lines comprises: determining the second value for the line of the second plurality of lines based on a third sample of video data included in the first block and a fourth sample of video data included in the third block.

Example 8

The method of any combination of examples 1-7, wherein the block of video data is included in a slice of video data, the method further comprising: if the first edge is a horizontal edge: adjusting, based on a quantity of horizontal edges of the slice and a width of the slice, the second value for the line of the first plurality of lines; and adjusting, based on a quantity of vertical edges of the slice and a height of the slice, the second value for the line of the second plurality of lines; or if the first edge is a vertical edge: adjusting, based on the quantity of vertical edges of the slice and the height of the slice, the second value for the line of the first plurality of lines; and adjusting, based on the quantity of horizontal edges of the slice and the width of the slice, the second value for the line of the second plurality of lines, wherein determining the average value comprises: determining, based on the adjusted second value for the line of the first plurality of lines and the adjusted second value for the line of the second plurality of lines, the average value.

Example 9

The method of any combination of examples 1-8, wherein determining, based on the average value, whether or not to determine the one or more deblocking parameter offsets comprises: if the average value is greater than a threshold, determining the one or more deblocking parameter offsets based on the average value; and if the average value is not greater than the threshold, not determining the one or more deblocking parameter offsets based on the average value.

Example 10

The method of any combination of examples 1-9, wherein the one or more deblocking parameter offsets comprise a $t_c$ offset value and a beta offset value, wherein the $t_c$ offset value and the beta offset value are determined approximately according to the following equations: $t_c$ offset=2*Clip3(threshold3,threshold4,avg/value2); and beta offset=2*Clip3(threshold5,threshold6,avg/value3), wherein: avg is the average value, threshold3, threshold4, threshold5, and threshold6 are threshold values, value2, and value3 are scaling values, and the function Clip3 is defined as follows:

$$\text{Clip3}(x, y, z) = \begin{cases} x; & z < x \\ y; & z > y \\ z; & \text{else} \end{cases}$$

Example 11

A device for encoding video data comprising one or more processors configured to: determine a first value for a line of a first plurality of lines, wherein the first plurality of lines are perpendicular to a first edge of a block of the video data; in response to determining that the first value satisfies at least one threshold: determine a second value for the line of the first plurality of lines; and determine a second value for a line of a second plurality of lines, wherein the second plurality of lines are perpendicular to a second edge of the block of video data, and wherein the first edge is a vertical edge or a horizontal edge and wherein the second edge is a different edge of the vertical edge or the horizontal edge; determine, based on the second value for the line of the first plurality of lines and the second value for the line of the second plurality of lines, an average value; and determine, based on the average value, whether or not to encode one or more deblocking parameter offsets.

Example 12

The device of example 11, wherein the block is a first block, wherein the first edge is the border between the first block and a second block, and wherein the one or more processors are configured to determine the first value for the line of the plurality of lines by at least: determining a first intermediate value based on a first set of sample values of video data corresponding to the line of the first plurality of lines, wherein the first set of sample values are included in the first block; determining a second intermediate value based on a second set of sample values of video data corresponding to the line of the first plurality of lines, wherein the second set of sample values are included in the second block; and determining the first value based on the first intermediate value and the second intermediate value.

Example 13

The device of any combination of examples 11-12, wherein the one or more processors are configured to determine the first intermediate value approximately according to the following equation: $dp_i = |p2_i - 2p1_i + p0_i|$, wherein $dp_i$ is the first intermediate value, wherein $p2_i$, $p1_i$, and $p0_i$ are sample values included in the first set of sample values, wherein the one or more processors are configured to determine the second intermediate value approximately according to the following equation: $dq_i = |q0_i - 2q1_i + q2_i|$, wherein $dq_i$ is the second intermediate value, wherein $q0_i$, $q1_i$, and $q2_i$ are sample values included in the second set of sample values, wherein the one or more processors are configured to determine the first value approximately according to the following equation: $d_i = (dp_i + dq_i)$, and wherein $d_i$ is the first value.

Example 14

The device of any combination of examples 11-13, wherein the one or more processors are configured to determine that the first value satisfies at least one threshold by at least: determining that the first value is greater than a first threshold and lesser than a second threshold.

Example 15

The device of any combination of examples 11-14, wherein the one or more processors are configured to determine the second value for the line of the first plurality of lines by at least: determining a second value for each line of the first plurality of lines; and determining a sum of the second values for each line of the first plurality of lines, wherein the one or more processors are configured to determine the second value for the line of the second plurality of lines by at least: determining a second value for each line of the second plurality of lines; and determining a sum of the second values for each line of the second plurality of lines, wherein the one or more processors are configured to determine the average value by at least: determining, based on the sum of the second values for each line of the first plurality of lines and the sum of the second values for each line of the second plurality of lines, the average value.

Example 16

The device of any combination of examples 11-15, wherein the block is a first block, wherein the first edge is the border between the first block and a second block, wherein the second edge is the border between the first block and a third block, wherein a third edge is the border between the first block and a fourth block, wherein a fourth edge is the border between the first block and a fifth block, wherein the third edge is parallel to the first edge, wherein the fourth edge is parallel to the second edge, wherein the one or more processors are further configured to: determine a second value for each line of a third plurality of lines, wherein the third plurality of lines are perpendicular to the third edge; determine a sum of the second values for each lines of the third plurality of lines; determine a second value for each line of a fourth plurality of lines, wherein the fourth plurality of lines are perpendicular to the fourth edge; and determine a sum of the second values for each lines of the fourth plurality of lines, wherein determining the average value comprises: determine, based on the sum of the second values for each line of the first plurality of lines, the sum of the second values for each line of the second plurality of lines, the sum of the second values for each line of the third plurality of lines, the sum of the second values for each line of the fourth plurality of lines, the average value.

Example 17

The device of any combination of examples 11-16, wherein the block is a first block, wherein the first edge is the border between the first block and a second block, wherein the second edge is the border between the first block and a third block, wherein the one or more processors are configured to determine the second value for the line of the first plurality of lines by at least: determining the second value for the line of the first plurality of lines based on a first sample of video data included in the first block and a second sample of video data included in the second block, wherein the one or more processors are configured to determine the second value for the line of the second plurality of lines by at least: determining the second value for the line of the second plurality of lines based on a third sample of video data included in the first block and a fourth sample of video data included in the third block.

Example 18

The device of any combination of examples 11-17, wherein the block of video data is included in a slice of video data, wherein the one or more processors are further configured to: if the first edge is a horizontal edge: adjust, based on a quantity of horizontal edges of the slice and a width of the slice, the second value for the line of the first plurality of lines; and adjust, based on a quantity of vertical edges of the slice and a height of the slice, the second value for the line of the second plurality of lines; or if the first edge is a vertical edge: adjust, based on the quantity of vertical edges of the slice and the height of the slice, the second value for the line of the first plurality of lines; and adjust, based on the quantity of horizontal edges of the slice and the width of the slice, the second value for the line of the second plurality of lines, wherein the one or more processors are configured to determine the average value by at least: determining, based on the adjusted second value for the line of the first plurality of lines and the adjusted second value for the line of the second plurality of lines, the average value.

Example 19

The device of any combination of examples 11-18, wherein the one or more processors are configured to determine, based on the average value, whether or not to determine the one or more deblocking parameter offsets by at least: determining, if the average value is greater than a threshold, the one or more deblocking parameter offsets based on the average value; and not determining, if the average value is not greater than the threshold, the one or more deblocking parameter offsets based on the average value.

Example 20

The device of any combination of examples 11-19, wherein the one or more deblocking parameter offsets comprise a $t_c$ offset value and a beta offset value, wherein the one or more processors are further configured to determine the $t_c$ offset value and the beta offset value approximately according to the following equations: $t_c$ offset=2*Clip3(threshold3,threshold4,avg/value2); and beta offset= 2*Clip3(threshold5,threshold6,avg/value3), wherein: avg is the average value, threshold3, threshold4, threshold5, and threshold6 are threshold values, value2, and value3 are scaling values, and the function Clip3 is defined as follows:

$$\text{Clip3}(x, y, z) = \begin{cases} x; & z < x \\ y; & z > y \\ z; & \text{else} \end{cases}.$$

Example 21

A device for encoding video data, the device comprising: means for determining a first value for a line of a first plurality of lines, wherein the first plurality of lines are perpendicular to a first edge of a block of the video data; means for determining, in response to determining that the first value satisfies at least one threshold, a second value for the line of the first plurality of lines; means for determining, in response to determining that the value satisfies the at least one threshold, a second value for a line of a second plurality of lines, wherein the second plurality of lines are perpendicular to a second edge of the block of video data, and wherein the first edge is a vertical edge or a horizontal edge and wherein the second edge is a different edge of the vertical edge or the horizontal edge; means for determining, based on the second value for the line of the first plurality of lines and the second value for the line of the second plurality of lines, an average value; and means for determining, based on the average value, whether or not to encode one or more deblocking parameter offsets.

Example 22

The device of example 21, wherein the block is a first block, wherein the first edge is the border between the first block and a second block, and wherein the means for determining the first value for the line of the plurality of lines comprise: means for determining a first intermediate value based on a first set of sample values of video data corresponding to the line of the first plurality of lines, wherein the first set of sample values are included in the first block; means for determining a second intermediate value based on a second set of sample values of video data corresponding to the line of the first plurality of lines, wherein the second set of sample values are included in the second block; and means for determining the first value based on the first intermediate value and the second intermediate value.

Example 23

The device of any combination of examples 21-22, wherein the means for determining that the first value satisfies at least one threshold comprise: means for determining that the first value is greater than a first threshold and lesser than a second threshold.

Example 24

The device of any combination of examples 21-23, wherein the means for determining the second value for the line of the first plurality of lines comprise: means for determining a second value for each line of the first plurality of lines; and means for determining a sum of the second values for each line of the first plurality of lines, wherein the means for determining the second value for the line of the second plurality of lines comprise: means for determining a second value for each line of the second plurality of lines; and means for determining a sum of the second values for each line of the second plurality of lines, wherein the means for determining the average value comprise: means for determining, based on the sum of the second values for each line of the first plurality of lines and the sum of the second values for each line of the second plurality of lines, the average value.

Example 25

The device of any combination of examples 21-24, wherein the block of video data is included in a slice of video data, the device further comprising: means for adjusting, if the first edge is a horizontal edge, the second value for the line of the first plurality of lines based on a quantity of horizontal edges of the slice and a width of the slice; means for adjusting, if the first edge is a horizontal edge, the second value for the line of the second plurality of lines based on a quantity of vertical edges of the slice and a height of the slice; means for adjusting, if the first edge is a vertical edge, the second value for the line of the first plurality of lines based on the quantity of vertical edges of the slice and the height of the slice; and means for adjusting, if the first edge is a vertical edge, the second value for the line of the second plurality of lines based on the quantity of horizontal edges of the slice and the width of the slice, wherein the means for determining the average value comprise: means for determining, based on the adjusted second value for the line of the first plurality of lines and the adjusted second value for the line of the second plurality of lines, the average value.

Example 26

The device of any combination of examples 21-25, wherein the means for determining, based on the average value, whether or not to determine the one or more deblocking parameter offsets comprise: means for determining, if the average value is greater than a threshold, the one or more deblocking parameter offsets based on the average value; and means for not determining, if the average value is not greater than the threshold, the one or more deblocking parameter offsets based on the average value.

Example 27

The device of any combination of examples 21-26, wherein the one or more deblocking parameter offsets comprise a $t_c$ offset value and a beta offset value, the device further comprising: means for determining the $t_c$ offset value and the beta offset value approximately according to the following equations: $t_c$ offset=2*Clip3(threshold3,threshold4,avg/value2); and beta offset=2*Clip3(threshold5, threshold6,avg/value3), wherein: avg is the average value, threshold3, threshold4, threshold5, and threshold6 are threshold values, value2, and value3 are scaling values, and the function Clip3 is defined as follows:

$$\text{Clip3}(x, y, z) = \begin{cases} x; & z < x \\ y; & z > y \\ z; & \text{else} \end{cases}$$

Example 28

A non-transitory computer-readable storage medium storing instructions that, when executed, cause one or more processors to encode video data, wherein the instructions that cause the one or more processors to encode the video data comprise instructions that cause the one or more processors to: determine a first value for a line of a first plurality of lines, wherein the first plurality of lines are perpendicular to a first edge of a block of the video data; in response to determining that the first value satisfies at least one threshold: determine a second value for the line of the first plurality of lines; determine a second value for a line of a second plurality of lines, wherein the second plurality of lines are perpendicular to a second edge of the block of video data, and wherein the first edge is a vertical edge or a horizontal edge and wherein the second edge is a different edge of the vertical edge or the horizontal edge; determine, based on the second value for the line of the first plurality of lines and the second value for the line of the second plurality of lines, an average value; and determine, based on the average value, whether or not to encode one or more deblocking parameter offsets.

Example 29

The non-transitory computer-readable storage medium of example 28, wherein the block is a first block, wherein the first edge is the border between the first block and a second block, and wherein the instructions that cause the one or more processors to determine the first value for the line of the plurality of lines comprise instructions that cause the one or more processors to: determine a first intermediate value based on a first set of sample values of video data corresponding to the line of the first plurality of lines, wherein the first set of sample values are included in the first block; determine a second intermediate value based on a second set of sample values of video data corresponding to the line of the first plurality of lines, wherein the second set of sample values are included in the second block; and determine the first value based on the first intermediate value and the second intermediate value.

Example 30

The non-transitory computer-readable storage medium of any combination of examples 28-29, wherein the instructions that cause the one or more processors to determine that the first value satisfies at least one threshold comprise instructions that cause the one or more processors to: determine that the first value is greater than a first threshold and lesser than a second threshold.

Example 31

The non-transitory computer-readable storage medium of any combination of examples 28-30, wherein the instructions that cause the one or more processors to determine the second value for the line of the first plurality of lines comprise instructions that cause the one or more processors to: determine a second value for each line of the first plurality of lines; and determine a sum of the second values for each line of the first plurality of lines, wherein the instructions that cause the one or more processors to determine the second value for the line of the second plurality of lines comprise instructions that cause the one or more processors to: determine a second value for each line of the second plurality of lines; and determine a sum of the second values for each line of the second plurality of lines, wherein the instructions that cause the one or more processors to determine the average value comprise instructions that cause the one or more processors to: determine, based on the sum of the second values for each line of the first plurality of lines and the sum of the second values for each line of the second plurality of lines, the average value.

Example 32

The non-transitory computer-readable storage medium of any combination of examples 28-31, wherein the block of video data is included in a slice of video data, further comprising instructions that cause the one or more processors to: adjust, if the first edge is a horizontal edge, the second value for the line of the first plurality of lines based on a quantity of horizontal edges of the slice and a width of the slice; adjust, if the first edge is a horizontal edge, the second value for the line of the second plurality of lines based on a quantity of vertical edges of the slice and a height of the slice; adjust, if the first edge is a vertical edge, the second value for the line of the first plurality of lines based on a quantity of vertical edges of the slice and a height of the slice; and adjust, if the first edge is a vertical edge, the second value for the line of the second plurality of lines based on a quantity of horizontal edges of the slice and a width of the slice, wherein the instructions that cause the one or more processors to determine the average value comprise instructions that cause the one or more processors to: determine, based on the adjusted second value for the line of the first plurality of lines and the adjusted second value for the line of the second plurality of lines, the average value.

Example 33

The non-transitory computer-readable storage medium of any combination of examples 28-32, wherein the instructions that cause the one or more processors to determine, based on the average value, whether or not to determine the one or more deblocking parameter offsets comprise instructions that cause the one or more processors to: determine, if the average value is greater than a threshold, the one or more deblocking parameter offsets based on the average value; and not determine, if the average value is not greater than the threshold, the one or more deblocking parameter offsets based on the average value.

Example 34

The non-transitory computer-readable storage medium of any combination of examples 24-33, wherein the one or more deblocking parameter offsets comprise a $t_c$ offset value and a beta offset value, further comprising instructions that cause the one or more processors to determine the $t_c$ offset value and the beta offset value approximately according to the following equations: $t_c$ offset=2*Clip3(threshold3, threshold4,avg/value2); and beta offset=2*Clip3(threshold5,threshold6,avg/value3), wherein: avg is the average value, threshold3, threshold4, threshold5, and threshold6 are threshold values, value2, and value3 are scaling values, and the function Clip3 is defined as follows:

$$\text{Clip3}(x, y, z) = \begin{cases} x; & z < x \\ y; & z > y \\ z; & \text{else} \end{cases}.$$

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for encoding video data comprising:
    determining, based on a first plurality of sample pixel values and a second plurality of sample pixel values, a first value for a pixel line of a first plurality of pixel lines, wherein the first plurality of sample values correspond to pixels along the pixel line of the first plurality of pixel lines that are included in a first block of the video data and the second plurality of sample values correspond to pixels along the pixel line of the first plurality of pixel lines that are included in a second block of the video data, wherein the first plurality of pixel lines are perpendicular to a first edge of the first block of the video data, and wherein the first edge is the border between the first block of the video data and the second block of the video data;
    in response to determining that the first value satisfies at least one threshold:
        determining, based on a sample value of the first plurality of sample values and a sample value of the second plurality of sample values, a second value for the pixel line of the first plurality of pixel lines; and
        determining, based on a sample value included in the first block of the video data and a sample value included in a third block of the video data, a second value for a pixel line of a second plurality of pixel lines, wherein the second plurality of pixel lines are perpendicular to a second edge of the first block of the video data, and wherein the first edge is a vertical edge or a horizontal edge, and wherein the second edge is a different edge of the vertical edge or the horizontal edge;
    determining, based on the second value for the pixel line of the first plurality of pixel lines and the second value for the pixel line of the second plurality of pixel lines, an average value;
    determining, based on the average value, whether or not to encode one or more deblocking parameter offsets; and
    encoding, in a coded video bitstream and responsive to determining to encode the one or more deblocking parameter offsets, the one or more deblocking parameter offsets.

2. The method of claim 1, wherein determining the first value for the pixel line of the first plurality of pixel lines comprises:
    determining a first intermediate value based on the first plurality of sample values corresponding to the pixel line of the first plurality of pixel lines;
    determining a second intermediate value based on the second plurality of sample values corresponding to the pixel line of the first plurality of pixel lines; and
    determining the first value based on the first intermediate value and the second intermediate value.

3. The method of claim 2, wherein the first intermediate value is determined approximately according to the following equation:

$$dp_i = |p2_i - 2p1_i + p0_i|,$$

wherein $dp_i$ is the first intermediate value, wherein $p2_i$, $p1_i$, and $p0_i$ are sample values included in the first plurality of sample values, wherein the second intermediate value is determined approximately according to the following equation:

$$dq_i = |q0_i - 2q1_i + q2_i|,$$

wherein $dq_i$ is the second intermediate value, wherein $q0_i$, $q1_i$, and $q2_i$ are sample values included in the second plurality of sample values, wherein the first value is determined approximately according to the following equation:

$$d_i = (dp_i + dq_i), \text{ and}$$

wherein $d_i$ is the first value.

4. The method of claim 1, wherein determining that the first value satisfies at least one threshold comprises:
    determining that the first value is greater than a first threshold and lesser than a second threshold.

5. The method of claim 1, wherein determining the second value for the pixel line of the first plurality of pixel lines comprises:
    determining a second value for each pixel line of the first plurality of pixel lines; and
    determining a sum of the second values for each pixel line of the first plurality of pixel lines, wherein determining the second value for the pixel line of the second plurality of pixel lines comprises:
    determining a second value for each pixel line of the second plurality of pixel lines; and
    determining a sum of the second values for each pixel line of the second plurality of pixel lines, wherein determining the average value comprises:
    determining, based on the sum of the second values for each pixel line of the first plurality of pixel lines and the sum of the second values for each pixel line of the second plurality of pixel lines, the average value.

6. The method of claim 5, wherein a third edge is the border between the first block and a fourth block, wherein a fourth edge is the border between the first block and a fifth block, wherein the third edge is parallel to the first edge, wherein the fourth edge is parallel to the second edge, the method further comprising:
   determining a second value for each pixel line of a third plurality of pixel lines, wherein the third plurality of pixel lines are perpendicular to the third edge;
   determining a sum of the second values for each pixel line of the third plurality of pixel lines;
   determining a second value for each pixel line of a fourth plurality of pixel lines, wherein the fourth plurality of pixel lines are perpendicular to the fourth edge; and
   determining a sum of the second values for each pixel line of the fourth plurality of pixel lines, wherein determining the average value comprises:
      determining, based on the sum of the second values for each pixel line of the first plurality of pixel lines, the sum of the second values for each pixel line of the second plurality of pixel lines, the sum of the second values for each pixel line of the third plurality of pixel lines, the sum of the second values for each pixel line of the fourth plurality of pixel lines, the average value.

7. The method of claim 1, wherein determining the second value for the pixel line of the first plurality of pixel lines comprises:
   determining the second value for the pixel line of the first plurality of pixel lines based on a first sample of video data included in the first block and a second sample of video data included in the second block,
   wherein determining the second value for the pixel line of the second plurality of pixel lines comprises:
   determining the second value for the pixel line of the second plurality of pixel lines based on a third sample of video data included in the first block and a fourth sample of video data included in the third block.

8. The method of claim 1, wherein the first block of video data is included in a slice of video data, the method further comprising:
   if the first edge is a horizontal edge:
      adjusting, based on a quantity of horizontal edges of the slice and a width of the slice, the second value for the pixel line of the first plurality of pixel lines; and
      adjusting, based on a quantity of vertical edges of the slice and a height of the slice, the second value for the pixel line of the second plurality of pixel lines; or
   if the first edge is a vertical edge:
      adjusting, based on the quantity of vertical edges of the slice and the height of the slice, the second value for the pixel line of the first plurality of pixel lines; and
      adjusting, based on the quantity of horizontal edges of the slice and the width of the slice, the second value for the pixel line of the second plurality of pixel lines,
   wherein determining the average value comprises:
      determining, based on the adjusted second value for the pixel line of the first plurality of pixel lines and the adjusted second value for the pixel line of the second plurality of pixel lines, the average value.

9. The method of claim 1, wherein determining, based on the average value, whether or not to determine the one or more deblocking parameter offsets comprises:
   if the average value is greater than a threshold, determining the one or more deblocking parameter offsets based on the average value; and
   if the average value is not greater than the threshold, not determining the one or more deblocking parameter offsets based on the average value.

10. The method of claim 1, wherein the one or more deblocking parameter offsets comprise a $t_c$ offset value and a beta offset value, wherein the $t_c$ offset value and the beta offset value are determined approximately according to the following equations:

$$t_c \text{ offset}=2*\text{Clip3}(\text{threshold3},\text{threshold4},\text{avg}/\text{value2});$$

and $$\text{beta offset}=2*\text{Clip3}(\text{threshold5},\text{threshold6},\text{avg}/\text{value3}),$$

wherein:
   avg is the average value,
   threshold3, threshold4, threshold5, and threshold6 are threshold values,
   value2, and value3 are scaling values, and
   the function Clip3 is defined as follows:

$$\text{Clip3}(x, y, z) = \begin{cases} x; & z < x \\ y; & z > y \\ z; & \text{else} \end{cases}.$$

11. A device for encoding video data comprising one or more processors configured to:
   determine, based on a first plurality of sample pixel values and a second plurality of sample pixel values, a first value for a pixel line of a first plurality of pixel lines, wherein the first plurality of sample values correspond to pixels along the pixel line of the first plurality of pixel lines that are included in a first block of the video data and the second plurality of sample values correspond to pixels along the pixel line of the first plurality of pixel lines that are included in a second block of the video data, wherein the first plurality of pixel lines are perpendicular to a first edge of the first block of the video data, and wherein the first edge is the border between the first block of the video data and the second block of the video data;
   in response to determining that the first value satisfies at least one threshold:
      determine, based on a sample value of the first plurality of sample values and a sample value of the second plurality of sample values, a second value for the pixel line of the first plurality of pixel lines; and
      determine, based on a sample value included in the first block of the video data and a sample value included in a third block of the video data, a second value for a pixel line of a second plurality of pixel lines, wherein the second plurality of pixel lines are perpendicular to a second edge of the first block of the video data, and wherein the first edge is a vertical edge or a horizontal edge and wherein the second edge is a different edge of the vertical edge or the horizontal edge;
   determine, based on the second value for the pixel line of the first plurality of pixel lines and the second value for the pixel line of the second plurality of pixel lines, an average value;
   determine, based on the average value, whether or not to encode one or more deblocking parameter offsets; and encode, in a coded video bitstream and responsive to determining to encode the one or more deblocking parameter offsets, the one or more deblocking parameter offsets.

12. The device of claim 11, wherein the one or more processors are configured to determine the first value for the pixel line of the plurality of pixel lines by at least:
   determining a first intermediate value based on the first plurality of sample values corresponding to the pixel line of the first plurality of pixel lines;
   determining a second intermediate value based on the second plurality of sample values corresponding to the pixel line of the first plurality of pixel lines; and
   determining the first value based on the first intermediate value and the second intermediate value.

13. The device of claim 12, wherein the one or more processors are configured to determine the first intermediate value approximately according to the following equation:

$$dp_i = |p2_i - 2p1_i + p0_i|,$$

wherein $dp_i$ is the first intermediate value, wherein $p2_i$, $p1_i$, and $p0_i$ are sample values included in the first plurality of sample values, wherein the one or more processors are configured to determine the second intermediate value approximately according to the following equation:

$$dq_i = |q0_i - 2q1_i + q2_i|,$$

wherein $dq_i$ is the second intermediate value, wherein $q0_i$, $q1_i$, and $q2_i$ are sample values included in the second plurality of sample values, wherein the one or more processors are configured to determine the first value approximately according to the following equation:

$$d_i = (dp_i + dq_i), \text{ and}$$

wherein $d_i$ is the first value.

14. The device of claim 11, wherein the one or more processors are configured to determine that the first value satisfies at least one threshold by at least:
   determining that the first value is greater than a first threshold and lesser than a second threshold.

15. The device of claim 11, wherein the one or more processors are configured to determine the second value for the pixel line of the first plurality of pixel lines by at least:
   determining a second value for each pixel line of the first plurality of pixel lines; and
   determining a sum of the second values for each pixel line of the first plurality of pixel lines, wherein the one or more processors are configured to determine the second value for the pixel line of the second plurality of pixel lines by at least:
      determining a second value for each pixel line of the second plurality of pixel lines; and
      determining a sum of the second values for each pixel line of the second plurality of pixel lines, wherein determining the average value comprises:
         determining, based on the sum of the second values for each pixel line of the first plurality of pixel lines and the sum of the second values for each pixel line of the second plurality of pixel lines, the average value.

16. The device of claim 15, wherein a third edge is the border between the first block and a fourth block, wherein a fourth edge is the border between the first block and a fifth block, wherein the third edge is parallel to the first edge, wherein the fourth edge is parallel to the second edge, wherein the one or more processors are further configured to:
   determine a second value for each pixel line of a third plurality of pixel lines, wherein the third plurality of pixel lines are perpendicular to the third edge;
   determine a sum of the second values for each pixel line of the third plurality of pixel lines;
   determine a second value for each pixel line of a fourth plurality of pixel lines, wherein the fourth plurality of pixel lines are perpendicular to the fourth edge; and
   determine a sum of the second values for each pixel line of the fourth plurality of pixel lines, wherein, to determine the average value, the one or more processors are configured to:
      determine, based on the sum of the second values for each pixel line of the first plurality of pixel lines, the sum of the second values for each pixel line of the second plurality of pixel lines, the sum of the second values for each pixel line of the third plurality of pixel lines, the sum of the second values for each pixel line of the fourth plurality of pixel lines, the average value.

17. The device of claim 11, wherein the one or more processors are configured to determine the second value for the pixel line of the first plurality of pixel lines by at least:
   determining the second value for the pixel line of the first plurality of pixel lines based on a first sample of video data included in the first block and a second sample of video data included in the second block,
   wherein the one or more processors are configured to determine the second value for the pixel line of the second plurality of pixel lines by at least:
   determining the second value for the pixel line of the second plurality of pixel lines based on a third sample of video data included in the first block and a fourth sample of video data included in the third block.

18. The device of claim 11, wherein the first block of video data is included in a slice of video data, wherein the one or more processors are further configured to:
   if the first edge is a horizontal edge:
      adjust, based on a quantity of horizontal edges of the slice and a width of the slice, the second value for the pixel line of the first plurality of pixel lines; and
      adjust, based on a quantity of vertical edges of the slice and a height of the slice, the second value for the pixel line of the second plurality of pixel lines; or
   if the first edge is a vertical edge:
      adjust, based on the quantity of vertical edges of the slice and the height of the slice, the second value for the pixel line of the first plurality of pixel lines; and
      adjust, based on the quantity of horizontal edges of the slice and the width of the slice, the second value for the pixel line of the second plurality of pixel lines,
   wherein the one or more processors are configured to determine the average value by at least:
      determining, based on the adjusted second value for the pixel line of the first plurality of pixel lines and the adjusted second value for the pixel line of the second plurality of pixel lines, the average value.

19. The device of claim 11, wherein the one or more processors are configured to determine, based on the average value, whether or not to determine the one or more deblocking parameter offsets by at least:
   determining, if the average value is greater than a threshold, the one or more deblocking parameter offsets based on the average value; and
   not determining, if the average value is not greater than the threshold, the one or more deblocking parameter offsets based on the average value.

20. The device of claim 11, wherein the one or more deblocking parameter offsets comprise a $t_c$ offset value and a beta offset value, wherein the one or more processors are further configured to determine the $t_c$ offset value and the beta offset value approximately according to the following equations:

$t_c$ offset=2*Clip3(threshold3,threshold4,avg/value2); and beta offset=2*Clip3(threshold5,threshold6,avg/value3), wherein:
avg is the average value,
threshold3, threshold4, threshold5, and threshold6 are threshold values,
value2, and value3 are scaling values, and
the function Clip3 is defined as follows:

$$\text{Clip3}(x, y, z) = \begin{cases} x; & z < x \\ y; & z > y \\ z; & \text{else} \end{cases}.$$

21. A device for encoding video data, the device comprising:
means for determining, based on a first plurality of sample pixel values and a second plurality of sample pixel values, a first value for a pixel line of a first plurality of pixel lines, wherein the first plurality of sample values correspond to pixels along the pixel line of the first plurality of pixel lines that are included in a first block of the video data and the second plurality of sample values correspond to pixels along the pixel line of the first plurality of pixel lines that are included in a second block of the video data, wherein the first plurality of pixel lines are perpendicular to a first edge of the first block of the video data, and wherein the first edge is the border between the first block of the video data and the second block of the video data;
means for determining, in response to determining that the first value satisfies at least one threshold and based on a sample value of the first plurality of sample values and a sample value of the second plurality of sample values, a second value for the pixel line of the first plurality of pixel lines;
means for determining, in response to determining that the value satisfies the at least one threshold and based on a sample value included in the first block of the video data and a sample value included in a third block of the video data, a second value for a pixel line of a second plurality of pixel lines, wherein the second plurality of pixel lines are perpendicular to a second edge of the first block of the video data, and wherein the first edge is a vertical edge or a horizontal edge, and wherein the second edge is a different edge of the vertical edge or the horizontal edge;
means for determining, based on the second value for the pixel line of the first plurality of pixel lines and the second value for the pixel line of the second plurality of pixel lines, an average value;
means for determining, based on the average value, whether or not to encode one or more deblocking parameter offsets; and means for encoding, in a coded video bitstream and responsive to determining to encode the one or more deblocking parameter offsets, the one or more deblocking parameter offsets.

22. The device of claim 21, wherein the means for determining the first value for the pixel line of the plurality of pixel lines comprise:
means for determining a first intermediate value based on the first plurality of sample values corresponding to the pixel line of the first plurality of pixel lines;
means for determining a second intermediate value based on the second plurality of sample values corresponding to the pixel line of the first plurality of pixel lines; and
means for determining the first value based on the first intermediate value and the second intermediate value.

23. The device of claim 21, wherein the means for determining the second value for the pixel line of the first plurality of pixel lines comprise:
means for determining a second value for each pixel line of the first plurality of pixel lines; and
means for determining a sum of the second values for each pixel line of the first plurality of pixel lines, wherein the means for determining the second value for the pixel line of the second plurality of pixel lines comprise:
means for determining a second value for each pixel line of the second plurality of pixel lines; and
means for determining a sum of the second values for each pixel line of the second plurality of pixel lines, wherein the means for determining the average value comprise:
means for determining, based on the sum of the second values for each pixel line of the first plurality of pixel lines and the sum of the second values for each pixel line of the second plurality of pixel lines, the average value.

24. The device of claim 21, wherein the first block of video data is included in a slice of video data, the device further comprising:
means for adjusting, if the first edge is a horizontal edge, the second value for the pixel line of the first plurality of pixel lines based on a quantity of horizontal edges of the slice and a width of the slice;
means for adjusting, if the first edge is a horizontal edge, the second value for the pixel line of the second plurality of pixel lines based on a quantity of vertical edges of the slice and a height of the slice;
means for adjusting, if the first edge is a vertical edge, the second value for the pixel line of the first plurality of pixel lines based on the quantity of vertical edges of the slice and the height of the slice; and
means for adjusting, if the first edge is a vertical edge, the second value for the pixel line of the second plurality of pixel lines based on the quantity of horizontal edges of the slice and the width of the slice,
wherein the means for determining the average value comprise:
means for determining, based on the adjusted second value for the pixel line of the first plurality of pixel lines and the adjusted second value for the pixel line of the second plurality of pixel lines, the average value.

25. The device of claim 21, wherein the means for determining, based on the average value, whether or not to determine the one or more deblocking parameter offsets comprise:

means for determining, if the average value is greater than a threshold, the one or more deblocking parameter offsets based on the average value; and means for not determining, if the average value is not greater than the threshold, the one or more deblocking parameter offsets based on the average value.

26. A non-transitory computer-readable storage medium storing instructions that, when executed, cause one or more processors to encode video data, wherein the instructions that cause the one or more processors to encode the video data comprise instructions that cause the one or more processors to:

determine, based on a first plurality of sample pixel values and a second plurality of sample pixel values, a first value for a pixel line of a first plurality of pixel lines, wherein the first plurality of sample values correspond to pixels along the pixel line of the first plurality of pixel lines that are included in a first block of the video data and the second plurality of sample values correspond to pixels along the pixel line of the first plurality of pixel lines that are included in a second block of the video data, wherein the first plurality of pixel lines are perpendicular to a first edge of the first block of the video data, and wherein the first edge is the border between the first block of the video data and the second block of the video data;

in response to determining that the first value satisfies at least one threshold:

determine, based on a sample value of the first plurality of sample values and a sample value of the second plurality of sample values, a second value for the pixel line of the first plurality of pixel lines;

determine, based on a sample value included in the first block of the video data and a sample value included in a third block of the video data, a second value for a pixel line of a second plurality of pixel lines, wherein the second plurality of pixel lines are perpendicular to a second edge of the first block of the video data, and wherein the first edge is a vertical edge or a horizontal edge, and wherein the second edge is a different edge of the vertical edge or the horizontal edge;

determine, based on the second value for the pixel line of the first plurality of pixel lines and the second value for the pixel line of the second plurality of pixel lines, an average value;

determine, based on the average value, whether or not to encode one or more deblocking parameter offsets; and encode, in a coded video bitstream and responsive to determining to encode the one or more deblocking parameter offsets, the one or more deblocking parameter offsets.

27. The non-transitory computer-readable storage medium of claim 26, wherein the instructions that cause the one or more processors to determine the first value for the pixel line of the plurality of pixel lines comprise instructions that cause the one or more processors to:

determine a first intermediate value based on the first plurality of sample values corresponding to the pixel line of the first plurality of pixel lines;

determine a second intermediate value based on the second plurality of sample values corresponding to the pixel line of the first plurality of pixel lines; and determine the first value based on the first intermediate value and the second intermediate value.

28. The non-transitory computer-readable storage medium of claim 26, wherein the instructions that cause the one or more processors to determine the second value for the pixel line of the first plurality of pixel lines comprise instructions that cause the one or more processors to:

determine a second value for each pixel line of the first plurality of pixel lines; and determine a sum of the second values for each pixel line of the first plurality of pixel lines, wherein the instructions that cause the one or more processors to determine the second value for the pixel line of the second plurality of pixel lines comprise instructions that cause the one or more processors to:

determine a second value for each pixel line of the second plurality of pixel lines; and determine a sum of the second values for each pixel line of the second plurality of pixel lines, wherein the instructions that cause the one or more processors to determine the average value comprise instructions that cause the one or more processors to:

determine, based on the sum of the second values for each pixel line of the first plurality of pixel lines and the sum of the second values for each pixel line of the second plurality of pixel lines, the average value.

29. The non-transitory computer-readable storage medium of claim 26, wherein the first block of video data is included in a slice of video data, further comprising instructions that cause the one or more processors to:

adjust, if the first edge is a horizontal edge, the second value for the pixel line of the first plurality of pixel lines based on a quantity of horizontal edges of the slice and a width of the slice;

adjust, if the first edge is a horizontal edge, the second value for the pixel line of the second plurality of pixel lines based on a quantity of vertical edges of the slice and a height of the slice;

adjust, if the first edge is a vertical edge, the second value for the pixel line of the first plurality of pixel lines based on a quantity of vertical edges of the slice and a height of the slice; and adjust, if the first edge is a vertical edge, the second value for the pixel line of the second plurality of pixel lines based on a quantity of horizontal edges of the slice and a width of the slice, wherein the instructions that cause the one or more processors to determine the average value comprise instructions that cause the one or more processors to:

determine, based on the adjusted second value for the pixel line of the first plurality of pixel lines and the adjusted second value for the line of the second plurality of pixel lines, the average value.

30. The non-transitory computer-readable storage medium of claim 26, wherein the instructions that cause the one or more processors to determine, based on the average value, whether or not to determine the one or more deblocking parameter offsets comprise instructions that cause the one or more processors to:

determine, if the average value is greater than a threshold, the one or more deblocking parameter offsets based on the average value; and not determine, if the average value is not greater than the threshold, the one or more deblocking parameter offsets based on the average value.

* * * * *